(12) United States Patent
Kouno et al.

(10) Patent No.: US 11,999,069 B2
(45) Date of Patent: Jun. 4, 2024

(54) END EFFECTOR, AND CONTROL DEVICE FOR CONTROLLING END EFFECTOR

(71) Applicant: Panasonic Intellectual Property Management Co., Ltd., Osaka (JP)

(72) Inventors: Hideyuki Kouno, Osaka (JP); Yuzuka Isobe, Osaka (JP); Tetsuo Sakata, Osaka (JP); Ryoga Sakaguchi, Osaka (JP); Masashi Eguchi, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 300 days.

(21) Appl. No.: 17/716,544

(22) Filed: Apr. 8, 2022

(65) Prior Publication Data

US 2022/0227002 A1 Jul. 21, 2022

Related U.S. Application Data

(63) Continuation of application No. PCT/JP2020/034843, filed on Sep. 15, 2020.

(30) Foreign Application Priority Data

Oct. 11, 2019 (JP) .................................. 2019-188193

(51) Int. Cl.
*B25J 9/16* (2006.01)
*B05C 1/02* (2006.01)
*B05C 1/06* (2006.01)
*B25J 11/00* (2006.01)
*B25J 15/00* (2006.01)

(52) U.S. Cl.
CPC ............... *B25J 9/1697* (2013.01); *B05C 1/02* (2013.01); *B05C 1/06* (2013.01); *B25J 9/1653* (2013.01); *B25J 9/1664* (2013.01); *B25J 11/0075* (2013.01); *B25J 15/0066* (2013.01)

(58) Field of Classification Search
CPC ...... B25J 9/1697; B25J 9/1679; B25J 9/1669; B25J 11/0075; B25J 15/0052–0066; B05C 1/00–165; B05C 13/00–025
See application file for complete search history.

(56) References Cited

U.S. PATENT DOCUMENTS

2019/0366553 A1* 12/2019 Simkins .................. B25J 9/1697
2022/0339794 A1* 10/2022 Golan .................. B25J 15/0066

FOREIGN PATENT DOCUMENTS

CN 106863334 6/2017
CN 106863334 A * 6/2017 ............. B05C 13/02
(Continued)

OTHER PUBLICATIONS

English translation of Office Action dated Aug. 26, 2023 in related Chinese Patent Application No. 202080070539.8.
(Continued)

*Primary Examiner* — Spencer D Patton
(74) *Attorney, Agent, or Firm* — Wenderoth, Lind & Ponack, L.L.P.

(57) ABSTRACT

An end effector connectable to a robot arm includes a camera, a support member that includes a marker and supports a workpiece, and a brush that performs coating on the workpiece. The camera is arranged at a position allowing the camera to capture a brush tip of the brush and the marker simultaneously.

5 Claims, 19 Drawing Sheets

(56) References Cited

FOREIGN PATENT DOCUMENTS

| | | |
|---|---|---|
| CN | 108607718 | 10/2018 |
| JP | 2002-28558 | 1/2002 |
| JP | 2006-62052 | 3/2006 |
| JP | 2009-255192 | 11/2009 |

OTHER PUBLICATIONS

International Search Report issued Nov. 2, 2020 in corresponding International Application No. PCT/JP2020/034843.
English translation of Office Action dated Feb. 11, 2023 in related Chinese Patent Application No. 202080070539.8.

* cited by examiner

END EFFECTOR, AND CONTROL DEVICE FOR CONTROLLING END EFFECTOR

BACKGROUND

1. Technical Field

The present disclosure relates to an end effector, and a control device for controlling an end effector.

2. Description of the Related Art

Patent Literature (PTL) 1 discloses a robot teaching system including a slave mechanism unit including a multi-degree-of-freedom articulated robot arm capable of reproducing movement of a human arm, a master mechanism unit that recognizes a writing motion including writing of characters or drawing of a figure performed by a writing person on a workpiece and teaches the multi-degree-of-freedom articulated robot arm such that the writing motion is reproducible, and a controller that is connected to the slave mechanism unit and the master mechanism unit, performs arithmetic processing on the writing motion recognized by the master mechanism unit, and controls the multi-degree-of-freedom articulated robot arm of the slave mechanism unit. The master mechanism unit includes writing information acquisition means for detecting a three-dimensional position and a posture of a writing instrument gripped by the writing person and mounted on the writing instrument for performing the writing motion on the workpiece, the three-dimensional position and the posture sequentially changing according to the writing motion, and acquiring the three-dimensional position and the posture as writing information, workpiece information acquisition means for detecting an inclination angle and a rotation angle of the workpiece when the writing motion is performed, and acquiring the inclination angle and the rotation angle as workpiece information in which the writing information and time series are associated with each other, and writing workpiece information transmission means for transmitting the acquired writing information and workpiece information to the controller. The controller includes writing workpiece information reception means for receiving the writing information and the workpiece information transmitted from the master mechanism unit, writing control data transmission means for performing arithmetic processing on writing control data for causing the multi-degree-of-freedom articulated robot arm to reproduce the writing motion based on the received writing information and transmitting the writing control data to the slave mechanism unit, and work control data transmission means for performing arithmetic processing on the workpiece control data for controlling a motion of a slave-side workpiece used in the writing motion reproduced by the multi-degree-of-freedom articulated robot arm based on the received workpiece information and transmitting the workpiece control data to the slave mechanism unit. The slave mechanism unit includes writing control data reception means for receiving the writing control data transmitted from the controller, the multi-degree-of-freedom articulated robot arm that is controlled based on the received writing control data and in which a slave-side writing instrument for reproducing the writing motion is provided at one end, workpiece control data reception means for receiving the workpiece control data transmitted from the controller, and a workpiece driving unit that is controlled based on the received workpiece control data and changes an inclination angle and a rotation angle of the slave-side workpiece according to a change in the workpiece during the writing motion.

PTL 1 is Unexamined Japanese Patent Publication No. 2006-62052.

SUMMARY

An object of the present disclosure is to provide an end effector connectable to a robot arm, the end effector including a camera, a support member, and a brush.

The present disclosure provides an end effector that is connectable to a robot arm. The end effector includes a camera, a support member that includes a marker and supports a workpiece, and a brush that performs coating on the workpiece. The camera is arranged at a position allowing the camera to capture a brush tip of the brush and the marker simultaneously.

According to the present disclosure, it is possible to provide the end effector connectable to the robot arm, the end effector including the camera, the support member, and the brush.

DETAILED DESCRIPTION

Background to the Present Disclosure

Robot devices used in factories can perform various works with interchangeable end effectors attached to a robot arm. The work is, for example, picking parts flowing on a factory production line using a robot hand as an end effector. The robot arm and the end effector are controlled by a control device (controller) connected to the robot arm.

As a type of the end effector, there are an end effector having a finger, an end effector having a deformable distal end of a hand such as a so-called soft hand, and the like, and these end effectors support a workpiece. That is, as a support member that supports the workpiece, there are a finger and a soft hand. There is also a brush-shaped end effector. The brush-shaped end effector enables a coating agent such as a moisture-proof agent to be applied to a workpiece such as a board used in a vehicle, for example. This coating prevents deterioration, moisture, and the like of the workpiece. The moisture-proof agent is an example of the coating agent, and the coating agent further includes an insulating agent for ensuring insulation, a dust-proof agent for preventing dust, an insect repellent for preventing insect damage, a vibration-resistant agent for imparting resistance to vibration, and the like.

In the relate art, many apparatuses for performing automatic coating on a board are of a spray type in which the coating agent is sprayed to the board. When the board is coated by spraying, masking is required at an end portion of the board. Since electronic components are usually attached to the board and there are irregularities on the board, there is a problem that a side surface portion generated by the irregularities cannot be applied.

Thus, in the present disclosure, the coating agent is applied by an end effector including a brush. A brush tip shape of the brush with which the coating agent is applied is captured by a camera, and whether or not the above-described coating is appropriately performed is checked based on the captured image.

With the above configuration, the coating can be performed on the end portion of the board without masking. Even though there are irregularities on the board, the side surface portion can be applied without unevenness. Hereinafter, the end effector of the present disclosure having such advantages will be described. A control device that controls the end effector of the present disclosure will also be described.

(Coating Work Example by End Effector 2: Gripped State)

Figure 1:
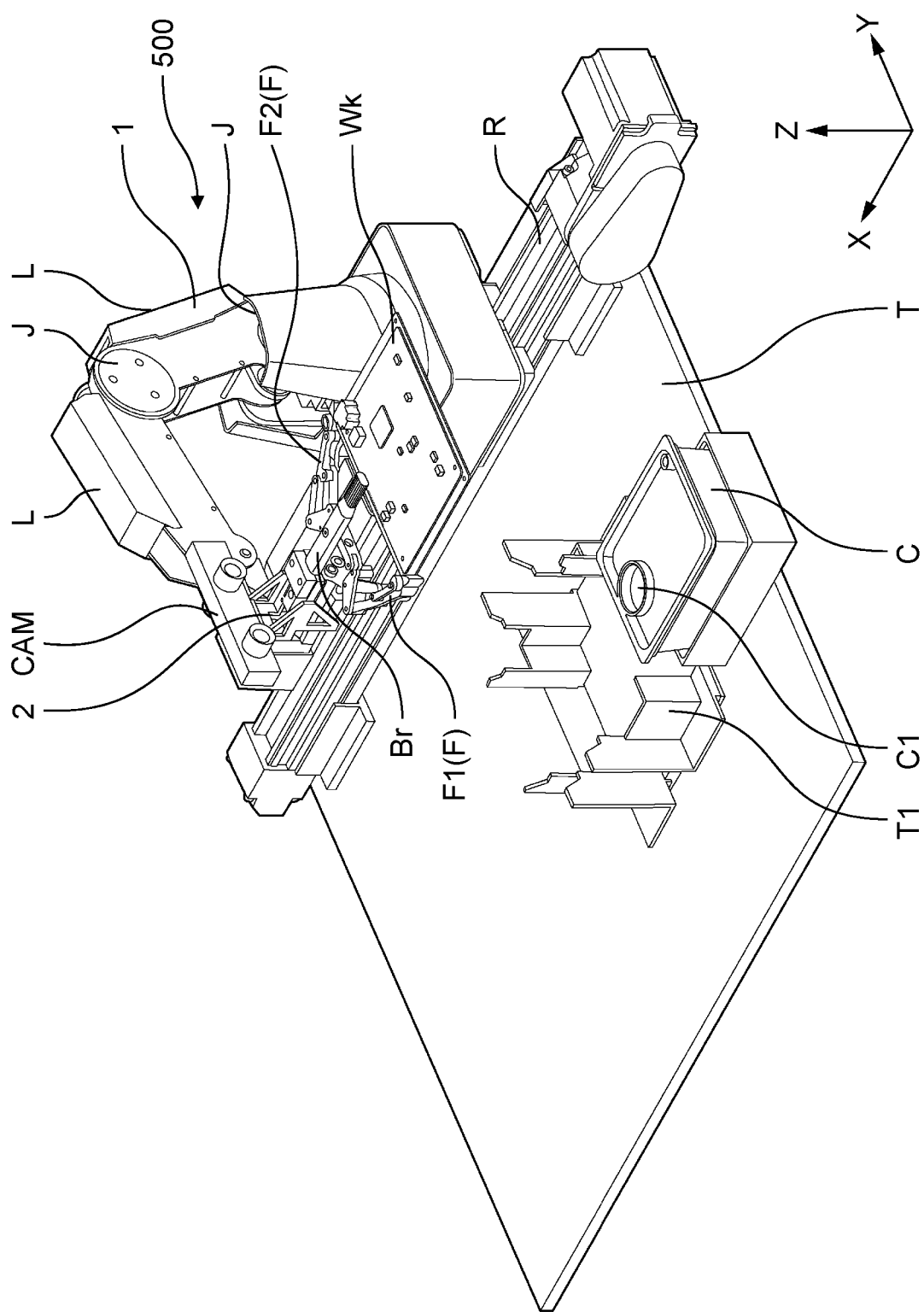
FIG. 1 is a perspective view illustrating a gripping state where end effector 2 grips workpiece Wk.
Figure 2:
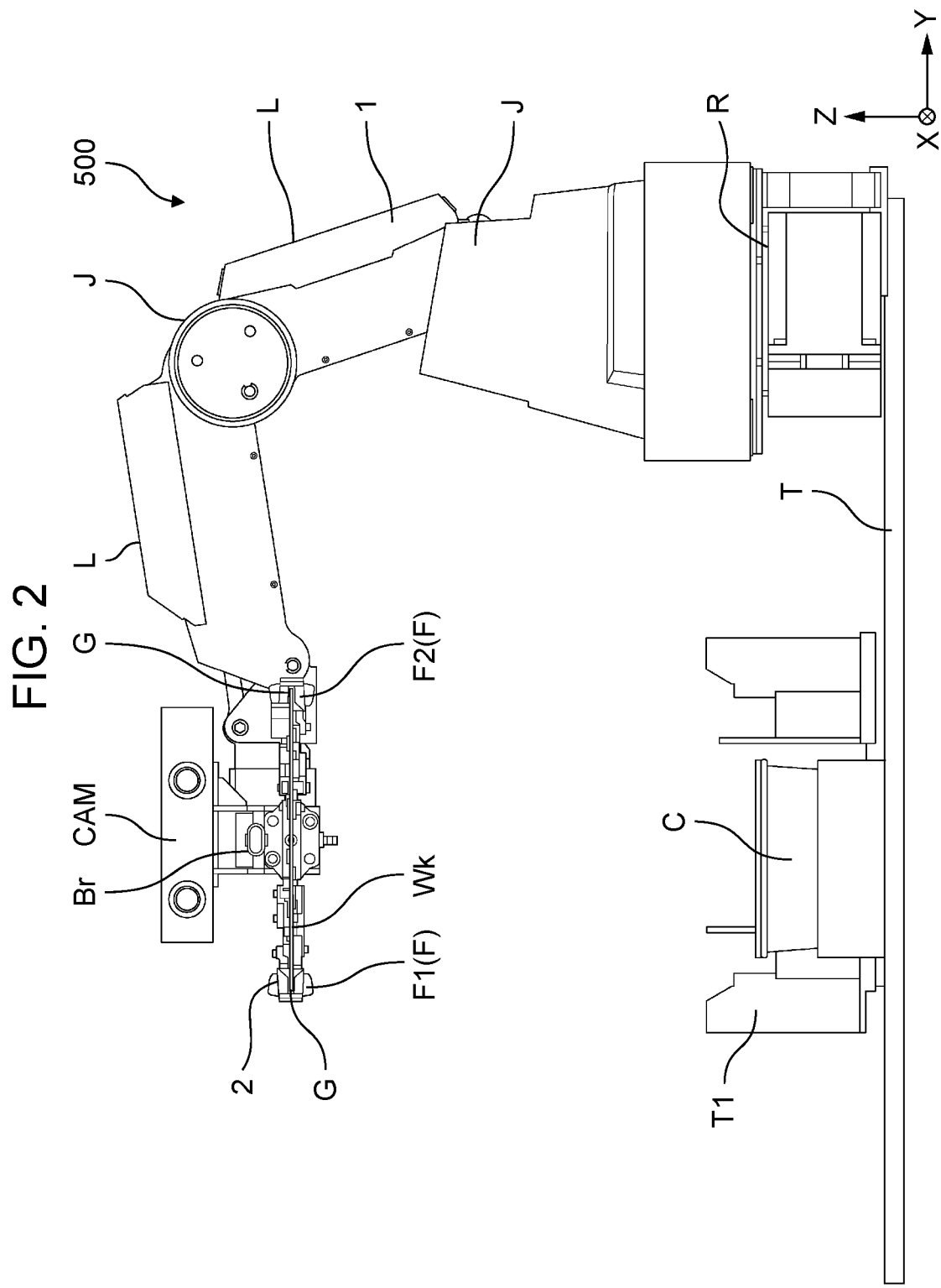
FIG. 2 is a side view illustrating the gripping state where end effector 2 grips workpiece Wk.
Figure 3:
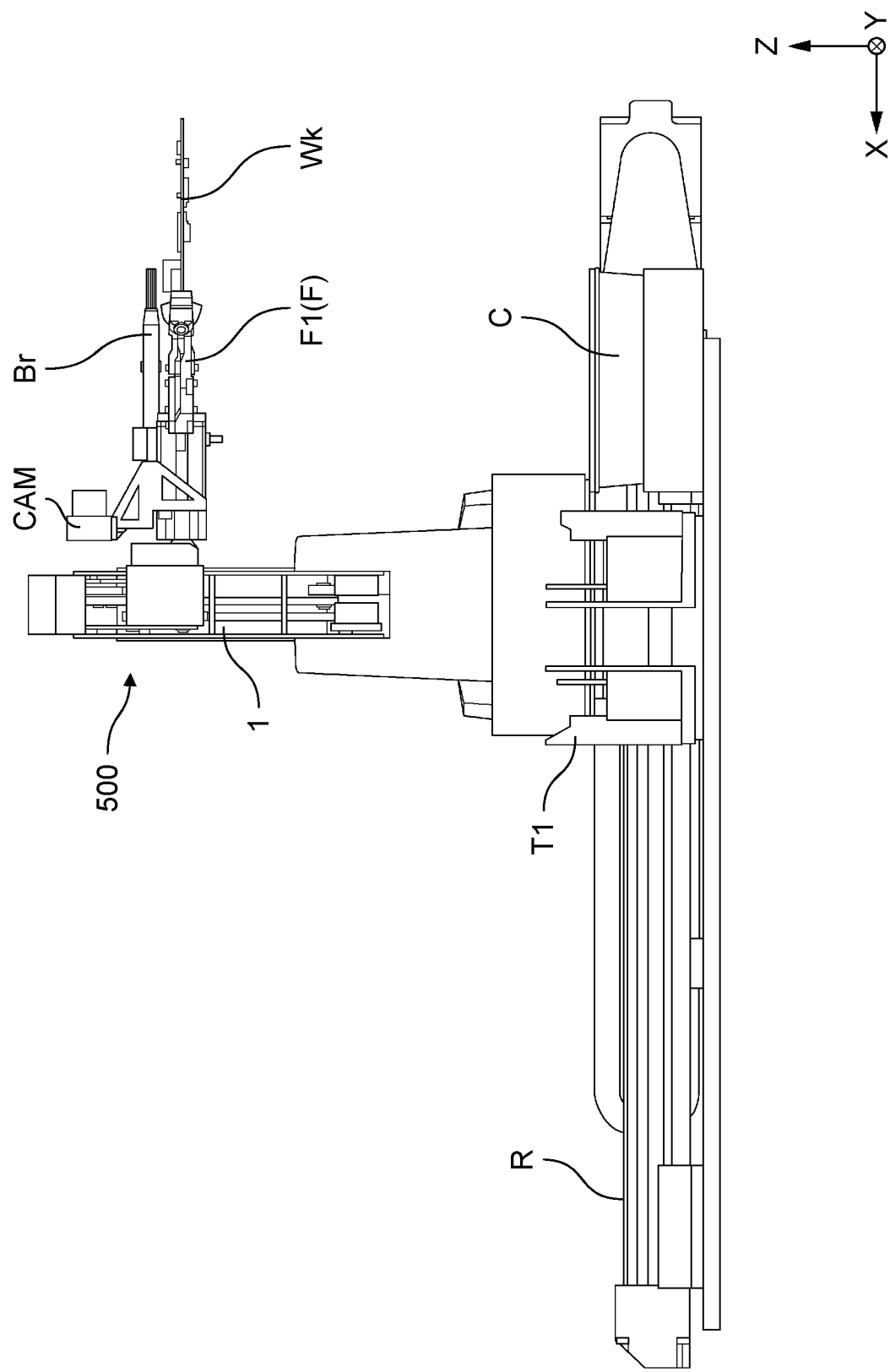
FIG. 3 is a front view illustrating the gripping state where end effector 2 grips workpiece Wk.
Figure 4:
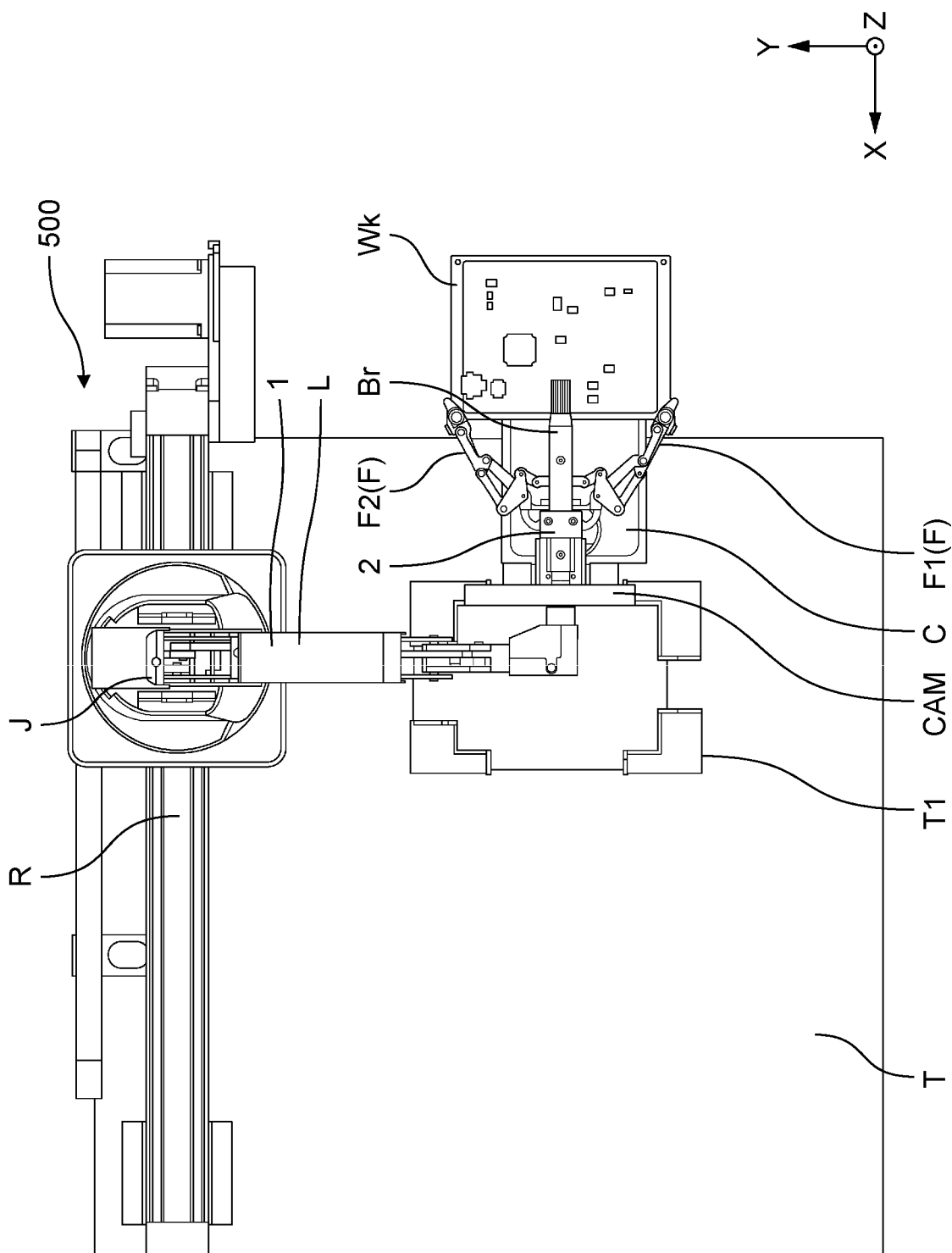
FIG. 4 is a plan view illustrating the gripping state where end effector 2 grips workpiece Wk.

First, a work example of applying the coating agent such as the moisture-proof agent to workpiece Wk by using end effector 2 of the present disclosure will be described. In the following description, it is assumed that a support member that supports workpiece Wk is a finger. However, there is no intention to limit the scope of the present disclosure to the finger, and the support member may include various members other than the finger, such as a soft hand. Workpiece Wk may be a board for a vehicle or the like. FIGS. 1 to 4 are drawings illustrating a gripping state where end effector 2 grips workpiece Wk. FIG. 1 is a perspective view, FIG. 2 is a side view, FIG. 3 is a front view, and FIG. 4 is a plan view.

Here, in order to facilitate understanding, an orthogonal coordinate system including an x-axis, a y-axis, and a z-axis is defined as illustrated in each drawing. The z-axis is perpendicular to the x-axis and the y-axis and extends in a height direction. Positive directions of the axes are defined to be directions of corresponding arrows of FIG. 1, and negative directions are defined to be directions opposite to the arrows.

Robot device 500 shown in FIG. 1 includes robot arm 1, and robot arm 1 is slidably attached to rail R. However, robot arm 1 may be directly fixed to work table T without using rail R. In the illustrated example, robot arm 1 is of an articulated type, and includes a plurality of joints (links) L. Each joint (link) L is connected via joint shaft J.

End effector 2 is connected to robot arm 1. Since each joint (link) L rotates about each joint shaft J, robot arm 1 can freely change a position and an angle of workpiece Wk gripped by end effector 2.

End effector 2 includes fingers F capable of supporting workpiece Wk and brush Br, and in this example, fingers F include two fingers of first finger F1 and second finger F2. However, the number of fingers is not limited to two, and any finger may be used as long as the finger can support workpiece Wk.

As illustrated in each drawing, particularly in FIG. 3, although fingers F and brush Br may be arranged substantially in parallel, fingers F and brush Br may be arranged not to be substantially in parallel. As shown in FIGS. 1 to 4, fingers F grip workpiece Wk to sandwich workpiece Wk between distal end portions of two of first finger F1 and second finger F2. Workpiece Wk is stored in a stock shelf (not illustrated) or the like before work. End effector 2 connected to robot arm 1 grips workpiece Wk, and mounts workpiece Wk on mounting portion T1 provided on work table T.

When workpiece Wk has a thin planar shape such as a board, as illustrated in FIG. 2, an end portion of workpiece Wk is gripped to be received by groove G provided in each of first finger F1 and second finger F2. It is assumed that positions of first finger F1 and second finger F2 in a state of gripping workpiece Wk are defined as gripping positions of fingers F.

End effector 2 includes camera CAM. In the illustrated example, although camera CAM includes two lenses, the number of lenses may be other than two. The application and arrangement of camera CAM will be described later.

(Coating Work Example by End Effector 2: At the Time of Coating)

Figure 5:
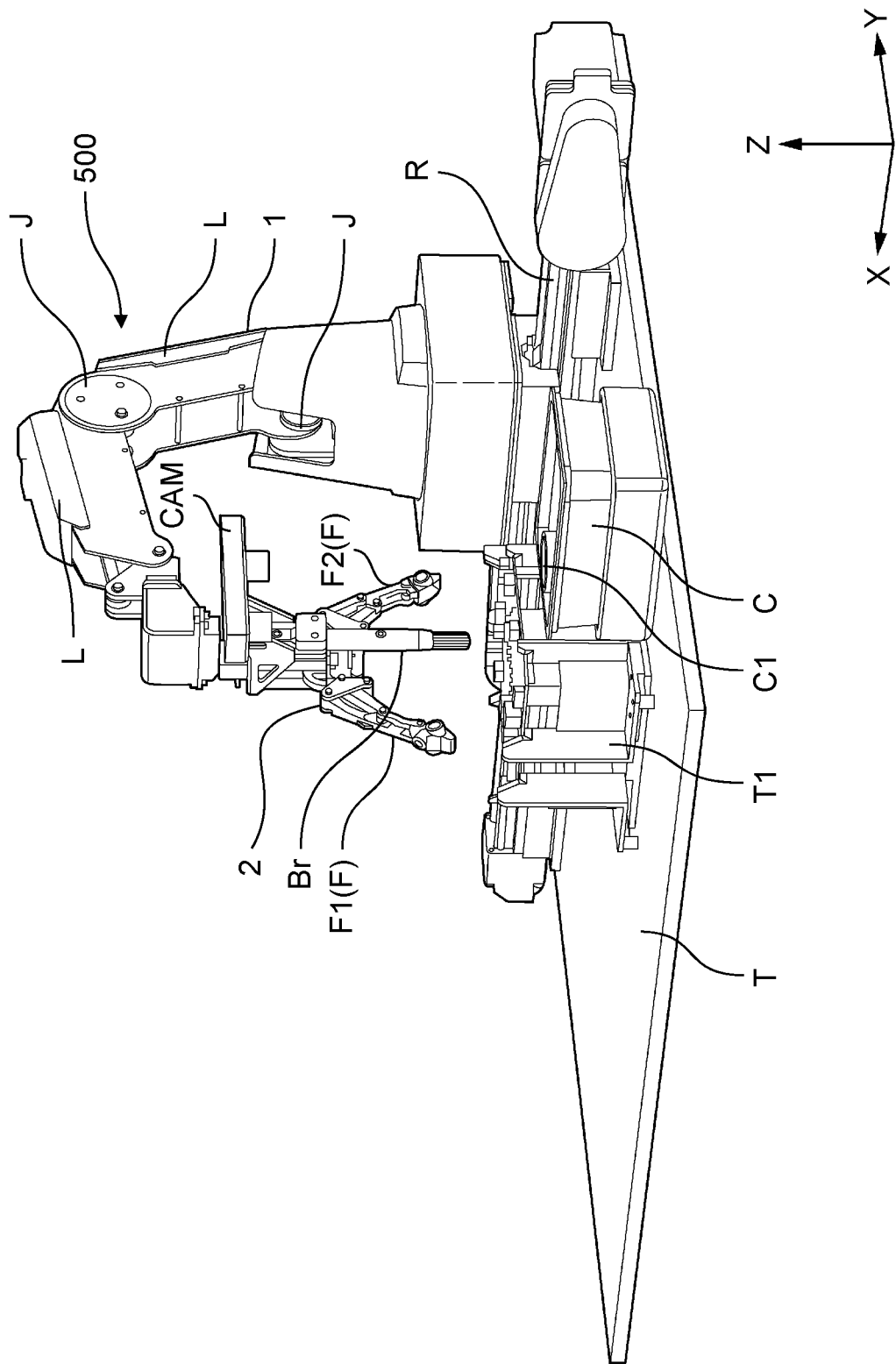
FIG. 5 is a perspective view illustrating a state at the time of coating in which a coating agent such as a moisture-proof agent is applied to a surface of workpiece Wk by brush Br included in end effector 2.
Figure 6:
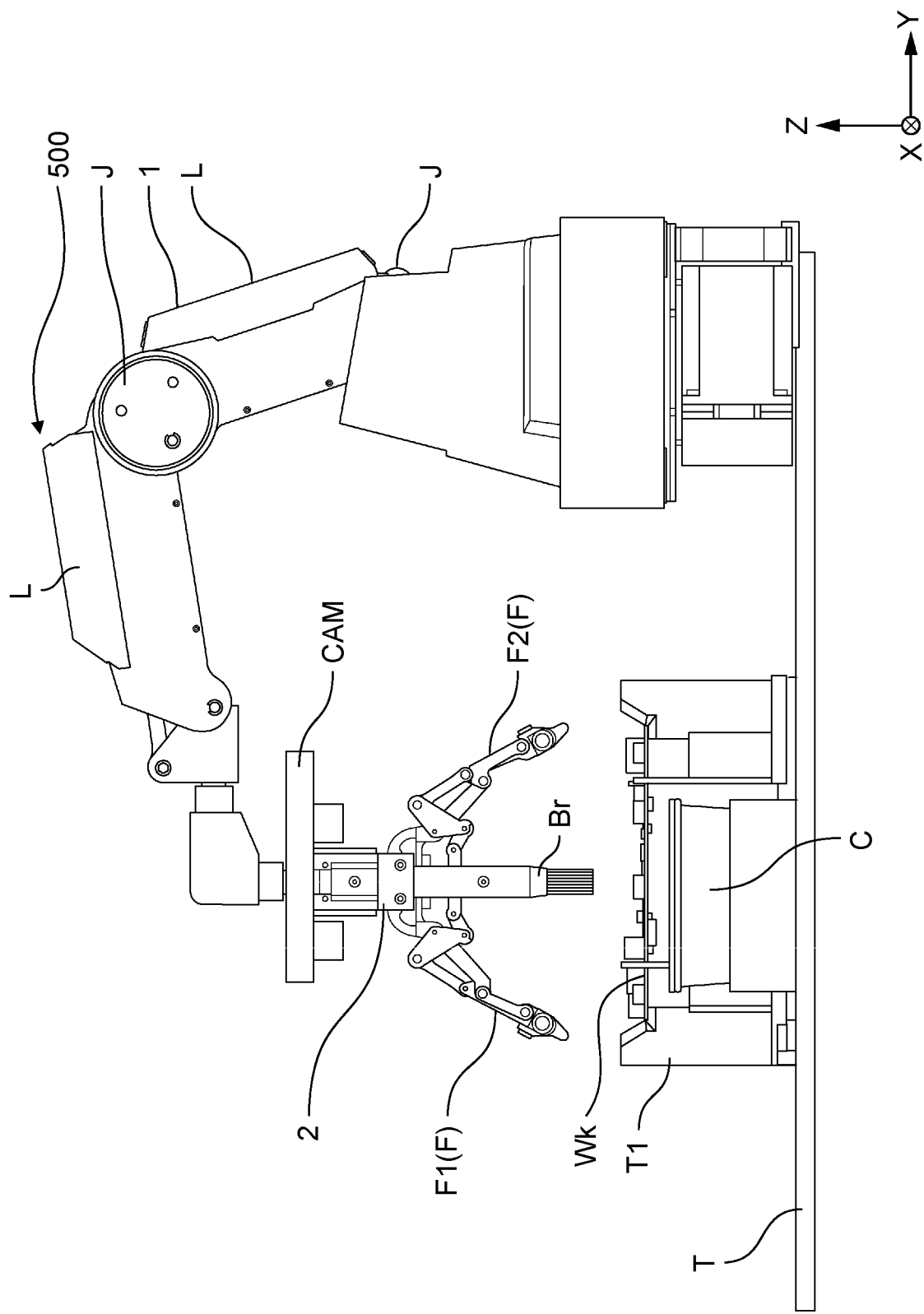
FIG. 6 is a side view illustrating a state at the time of coating in which the coating agent such as the moisture-proof agent is applied to the surface of workpiece Wk by brush Br included in end effector 2.
Figure 7:
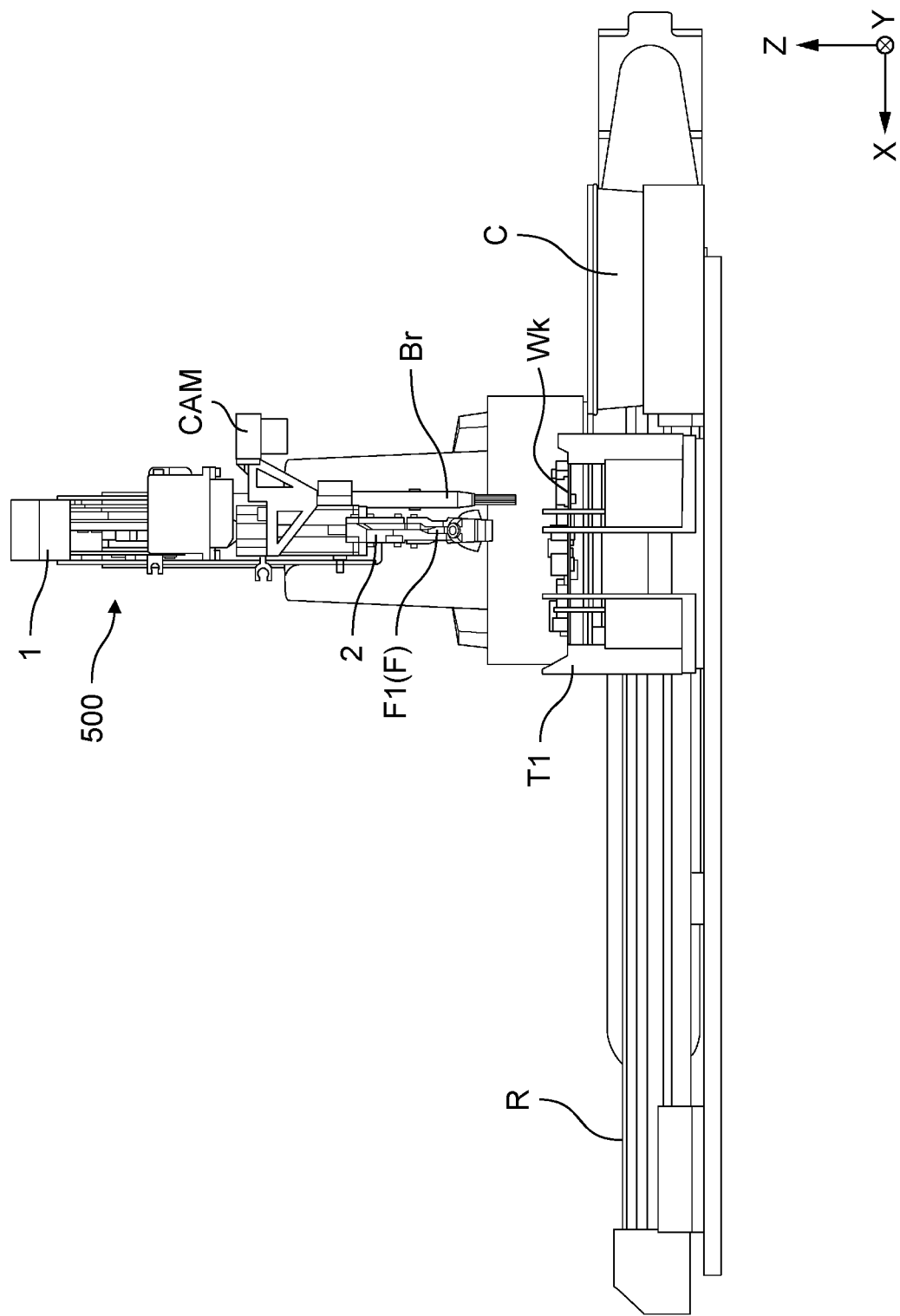
FIG. 7 is a front view illustrating a state at the time of coating in which the coating agent such as the moisture-proof agent is applied to the surface of workpiece Wk by brush Br included in end effector 2.
Figure 8:
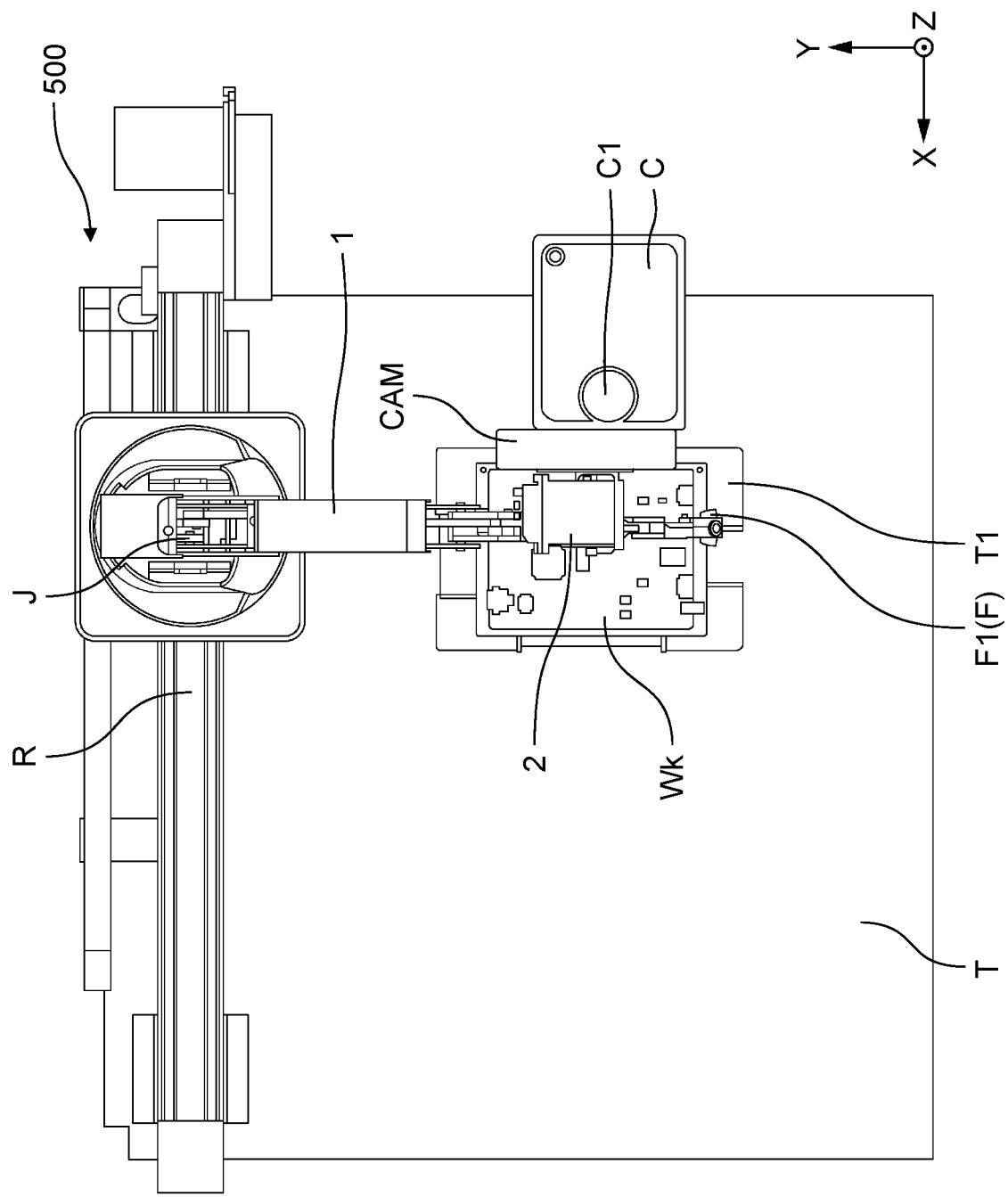
FIG. 8 is a plan view illustrating a state at the time of coating in which the coating agent such as the moisture-proof agent is applied to the surface of workpiece Wk by brush Br included in end effector 2.

FIGS. 5 to 8 are drawings illustrating a state at the time of coating in which the coating agent such as the moisture-proof agent is applied to a surface of workpiece Wk by brush Br included in end effector 2. FIG. 5 is a perspective view, FIG. 6 is a side view, FIG. 7 is a front view, and FIG. 8 is a plan view.

Since basic configurations of robot arm 1 and end effector 2 are as described above with reference to FIGS. 1 to 4, the description thereof will be omitted, and camera CAM that captures brush Br at the time of coating will be described. As illustrated in FIGS. 5 to 8, after workpiece Wk is mounted on work table T, end effector 2 attaches a distal end of brush Br to hole Cl of container C containing the coating agent. Since container C contains the coating agent, the coating agent adheres to a distal end portion of brush Br. In this state, brush Br included in end effector 2 is moved to trace over workpiece Wk as the board, and thus, the coating agent is applied to the surface of workpiece Wk. The coating agent may contain a dye or the like that shines with black light. It is also possible to specify a leakage portion of the coating by applying black light (not illustrated) to workpiece Wk on which a coating work has been completed.

End effector 2 includes camera CAM. Camera CAM captures an image of the brush tip of brush Br while workpiece Wk is being applied (at the time of coating). This captured image is used to confirm whether or not the coating is correctly performed. In order to prevent finger F from colliding with workpiece Wk or the like at the time of coating, the length of brush Br is preferably longer than the length of finger F at the time of coating. When finger F is of a type including joint (link) L and joint shaft J as illustrated in the drawing, finger F may be bent to be open, and the brush tip of brush Br may be in a posture further protruding toward workpiece Wk than finger F is. That is, the brush tip of brush Br is configured to further protrude toward workpiece Wk than finger F is at the time of coating in which workpiece Wk is applied by brush Br. As a result, it is possible to avoid finger F from colliding with workpiece Wk at the time of coating.

(Enlarged View of End Effector 2)

Figure 9:
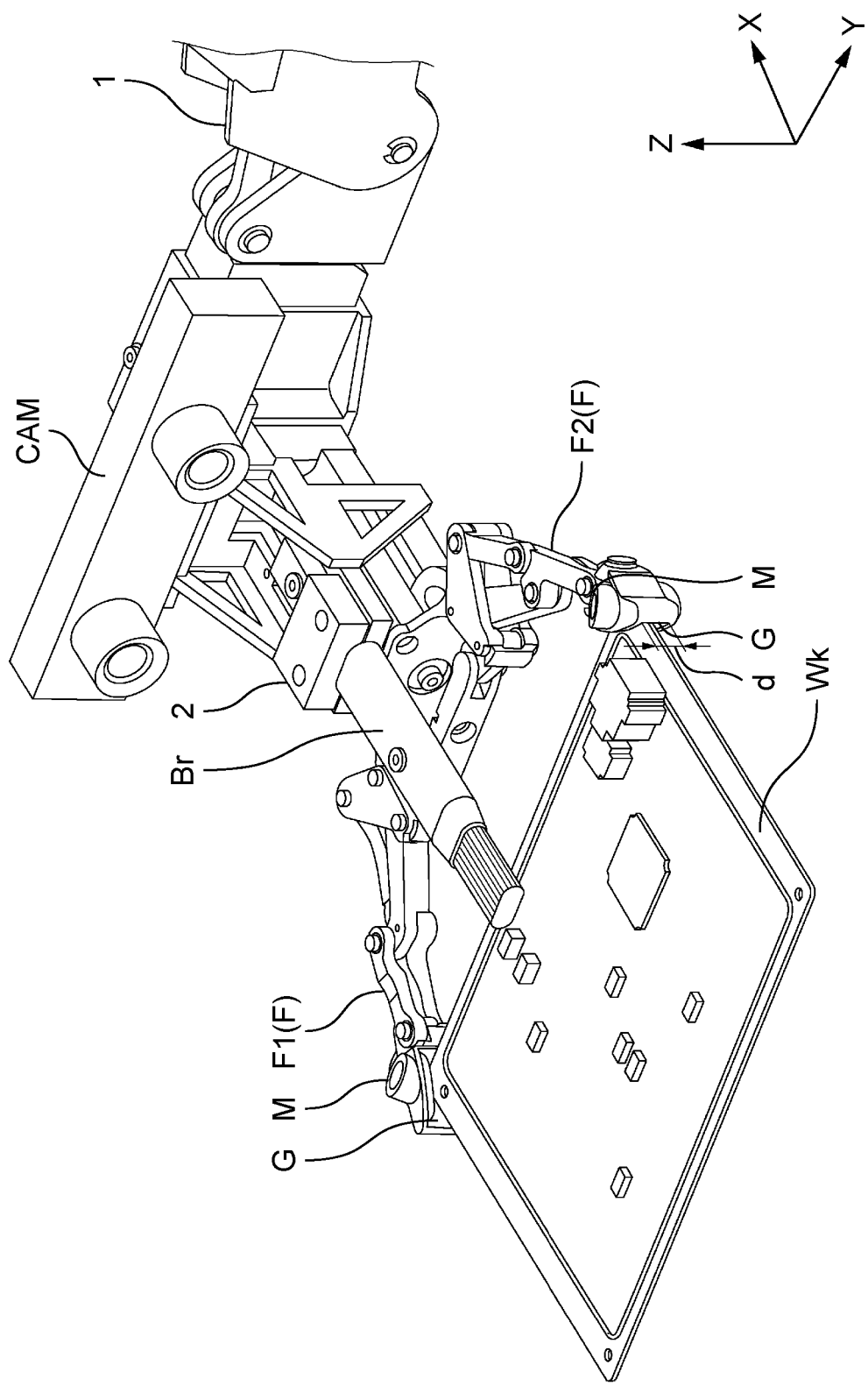
FIG. 9 is an enlarged view of end effector 2.

FIG. 9 is an enlarged view of end effector 2 described above. As illustrated in the drawing, grooves G are provided at the distal end portions of first finger F1 and second finger F2, and first finger F1 and second finger F2 grip workpiece Wk to sandwich workpiece Wk such that grooves G receive the end portion of workpiece Wk. Although width d of groove G may be about the same as a thickness of the board which is workpiece Wk, width d of groove G may be larger than the thickness of the board. When width d of groove G is larger than the thickness of the board, some clearance occurs in the distal end portion of each finger when first finger F1 and second finger F2 grip workpiece Wk to sandwich workpiece Wk. That is, some rattling occurs when end effector 2 is moved. This rattling absorbs an impact on workpiece Wk caused when end effector 2 carries workpiece Wk. As a result, damage and failure of workpiece Wk can be avoided.

Each of first finger F1 and second finger F2 includes marker M. Marker M may be, for example, a red lamp or the like, and it is possible to identify a current shape of end effector 2 (a degree of opening of first finger F1 and second finger F2 or the like) and the presence or absence of gripping of workpiece Wk by detecting positions of markers M from the captured image captured by camera CAM.

(Arrangement of Camera)

Figure 10:
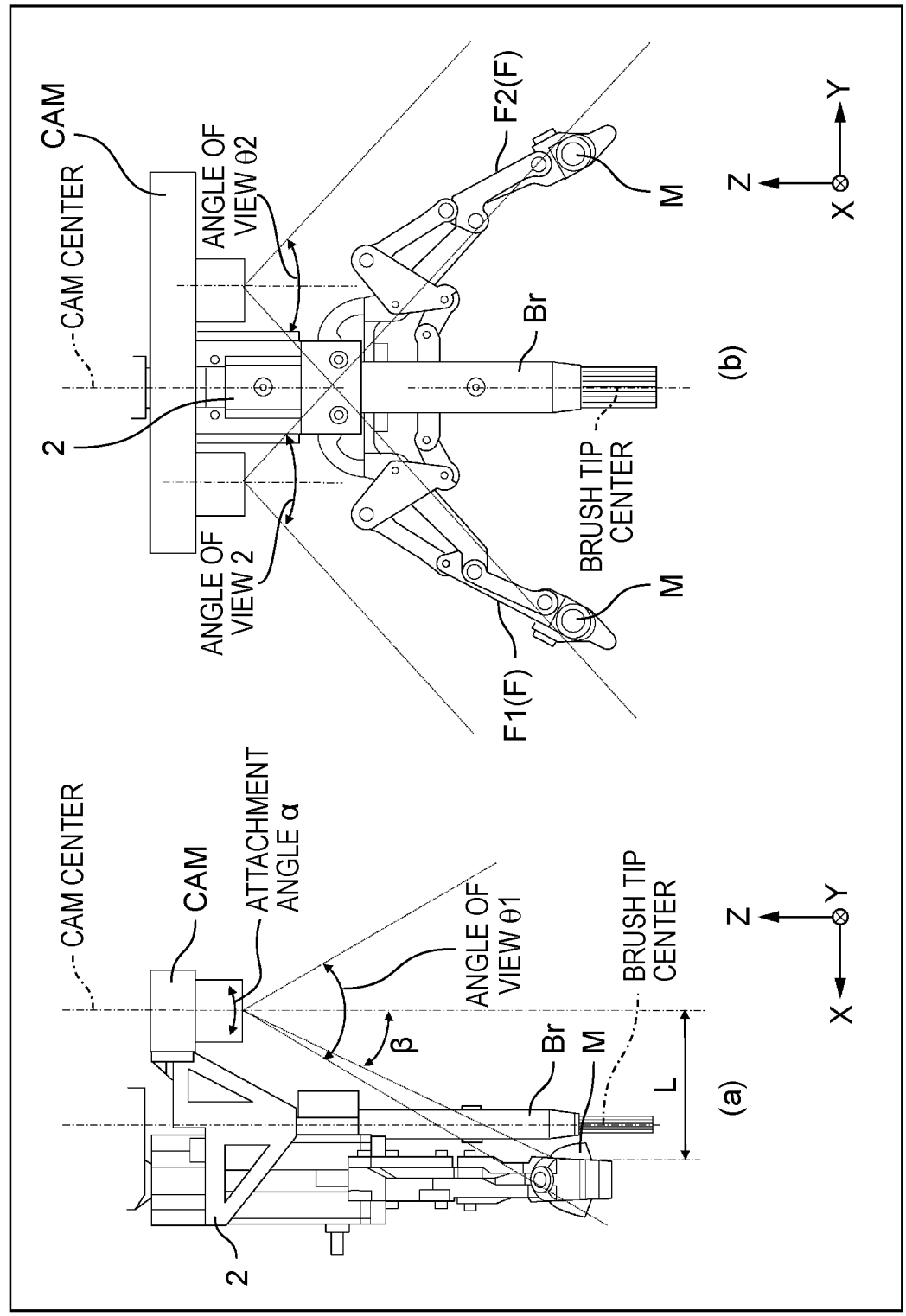
FIG. 10 is a drawing illustrating arrangement examples of camera CAM, part (a) is a front view, and part (b) is a side view.

FIG. 10 is a drawing illustrating an arrangement example of camera CAM, where part (a) is a front view and part (b) is a side view. Camera CAM is arranged at a position where the brush tip of brush Br can be captured. Camera CAM is arranged at a position where markers M provided in first finger F1 and second finger F2 of end effector 2 can be captured. Camera CAM is arranged at such a position, and thus, a state of the brush tip of brush Br and states of first finger F1 and second finger F2 of end effector 2 can be simultaneously confirmed by using the captured image.

In part (a) of FIG. 10, end effector 2 is in a state where the coating agent can be applied to workpiece Wk. In this state, camera CAM is attached such that a direction of the camera can be changed along an x-axis direction of the illustrated orthogonal coordinate system. For this attachment method, an attachment method of the related art may be used. It is assumed that an attachment angle of camera CAM in the x-axis direction is $\alpha$. It is assumed that an angle of view of camera CAM in the x-axis direction is $\theta_1$.

It is assumed that a distance between a lens distal end portion of camera CAM and marker M in a perpendicular direction drawn from a center of camera CAM along the z-axis of the illustrated orthogonal coordinate system is H. It is assumed that a distance between marker M and the center of camera CAM in the x-axis direction is L. It is assumed that $\beta = \arctan(L/H)$ is satisfied.

At this time, marker M falls within the angle of view of camera CAM by setting attachment angle $\alpha$ of the camera such that $\theta_1/2 + \alpha > \beta$ is satisfied.

In part (b) of FIG. 10, it is assumed that an angle of view of camera CAM in a y-axis direction is $\theta_2$. At this time, a value of $\theta_2$ may be set such that both marker M included in first finger F1 and marker M included in second finger F2 fall within angle of view $\theta_2$ of camera CAM. As in part (a) of FIG. 10, angle of view $\theta_2$ of camera CAM may be determined in consideration of the attachment angle of camera CAM.

Here, in the illustrated example, camera CAM is attached to end effector 2. That is, when end effector 2 is moved by robot arm 1, camera CAM also moves following the movement. With the above configuration, since a relative position of camera CAM with respect to brush Br and marker M is fixed, image processing and calculation processing based on the image captured by camera CAM are suitably reduced. However, camera CAM may be at a position where the brush tip of brush Br and marker M can be simultaneously captured. Thus, camera CAM may not be attached to end effector 2. For example, camera CAM may be attached to a ceiling or the like of a factory.

(Configuration of Control Device 100)

Figure 11:
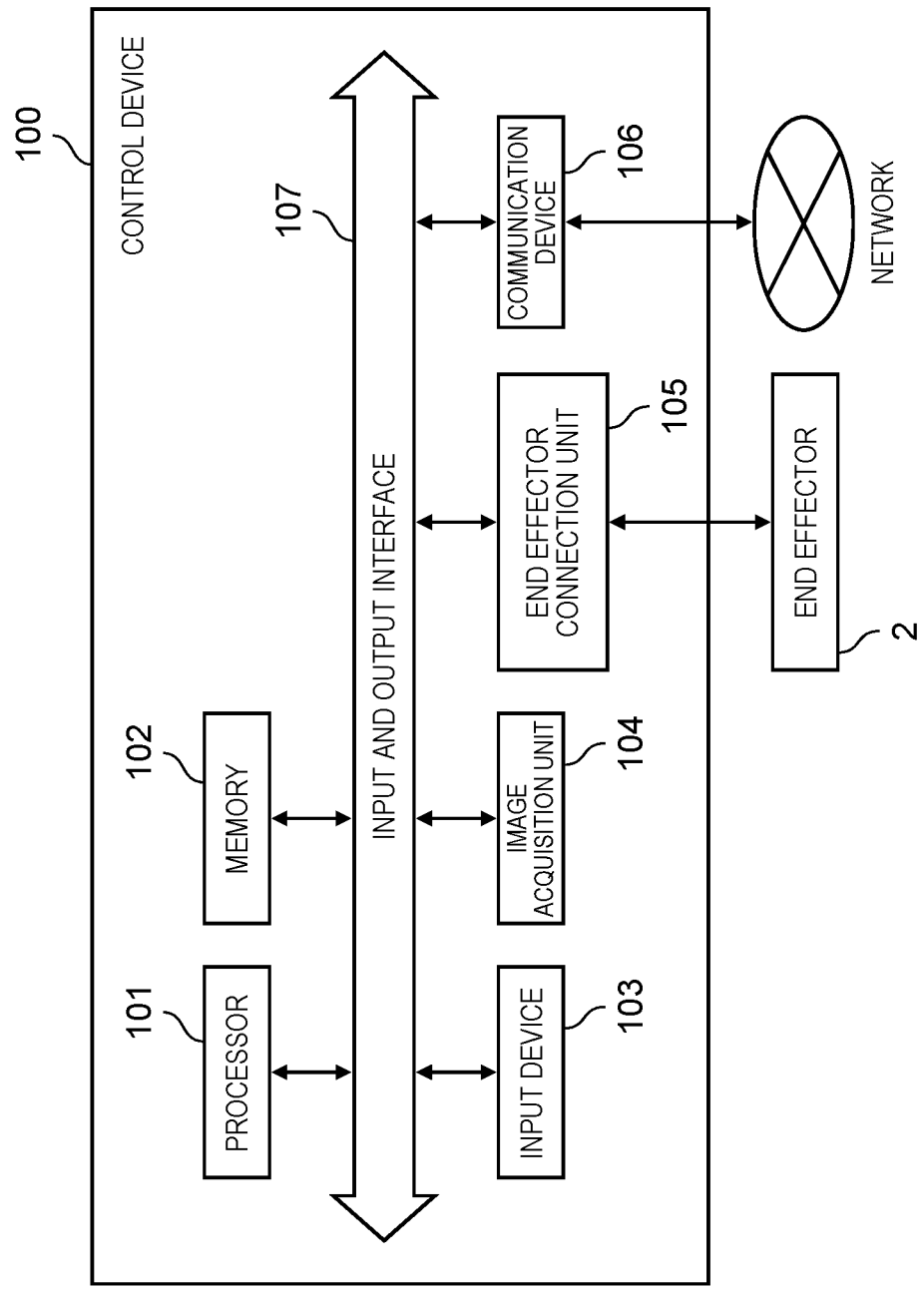
FIG. 11 is a block diagram showing a hardware configuration example of control device 100.

Next, an example of control device 100 that controls end effector 2 of the present disclosure will be described. FIG. 11 is a block diagram illustrating a hardware configuration example of control device 100. Control device 100 is connected to end effector 2 and controls end effector 2. Control device 100 may be connected to robot arm 1 and end effector 2 to control robot arm 1 and end effector 2.

Control device 100 has a configuration including processor 101, memory 102, input device 103, image acquisition unit 104, end effector connection unit 105, communication device 106, and input and output interface 107. Memory 102, input device 103, image acquisition unit 104, end effector connection unit 105, communication device 106, and input and output interface 107 are each connected to processor 101 by an internal bus or the like to be capable of inputting and outputting data or information.

Processor 101 includes, for example, a central processing unit (CPU), a micro processing unit (MPU), a digital signal processor (DSP), or a field programmable gate array (FPGA). Processor 101 functions as a controller of control device 100, and performs control processing for comprehensively controlling an operation of each unit of control device 100, input and output processing of data or information with each unit of control device 100, data calculation processing, and data or information storage processing. Processor 101 functions also as a controller that controls end effector 2.

Memory 102 may include a hard disk drive (HDD), a read-only memory (ROM), a random access memory (RAM), and the like, and stores various programs (an operating system (OS), application software, and the like) to be executed by processor 101, and various kinds of data. Memory 102 may store data indicating the shape of the brush tip of brush Br to be described later.

Input device 103 may include a keyboard, a mouse, and the like, has a function as a human interface for a user, and receives a manipulation input from the user. In other words, input device 103 is used for giving an input or an instruction for various kinds of processing executed by control device 100. Input device 103 may be a programming pendant connected to control device 100.

Image acquisition unit 104 is connectable to camera CAM via wire or by wireless, and acquires an image captured by camera CAM. Control device 100 is capable of appropriately performing image processing on the image acquired by image acquisition unit 104. Processor 101 may mainly perform this image processing. Control device 100 may further include an image processing unit (not illustrated), and the image processing unit may be connected to control device 100. Under control of processor 101, the image processing unit can perform image processing.

End effector connection unit 105 is a component that secures the connection with end effector 2, and control device 100 and end effector 2 (and robot arm 1) are connected via end effector connection unit 105. This connection may be a wired connection using a connector and a cable or the like, but may alternatively be a wireless connection. At the time of this connection, end effector connection unit 105 acquires identification information for identifying end effector 2 from end effector 2. In other words, end effector connection unit 105 functions as an identification information acquisition unit. The identification information may be further acquired by processor 101 from end effector connection unit 105. The identification information enables identifying a type of end effector 2 connected.

Communication device 106 is a component for communicating with the outside via a network. This communication may be wired communication or wireless communication.

Input and output interface 107 has a function as an interface through which data or information is input or output from or to control device 100.

The above configuration of control device 100 is an example, and may not include all the above components. Control device 100 may further include an additional component. For example, box-shaped control device 100 may have wheels, and robot arm 1 and end effector 2 may be mounted and self-propelled on control device 100. In this case, rail R illustrated in FIGS. 1 to 4 is unnecessary.

(Coating Control Example of Coating Agent)

Figure 12:
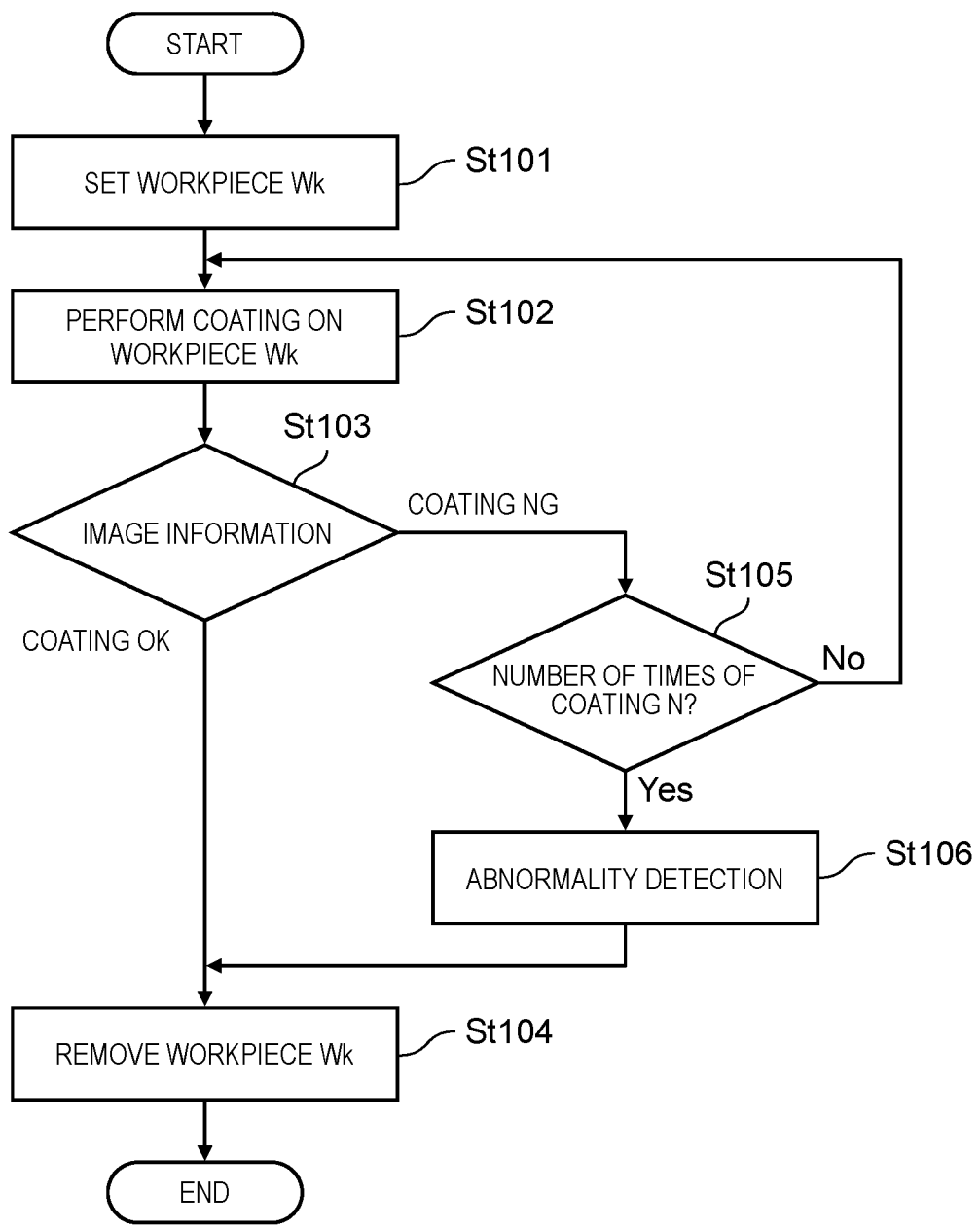
FIG. 12 is a flowchart illustrating a coating step based on control by control device 100.

FIG. 12 is a flowchart illustrating a coating step based on the control by control device 100. This flowchart illustrates processing steps for one workpiece Wk. However, coating processing may be sequentially performed on a plurality of workpieces Wk according to a similar flow.

First, under the control of processor 101, robot device 500 sets workpiece Wk on mounting portion T1 of work table T (step St101). More specifically, robot device 500 controlled by processor 101 grips workpiece Wk arranged on a storage stock shelf or the like by first finger F1 and second finger F2, moves workpiece Wk, and mounts workpiece Wk on mounting portion T1 of work table T.

Subsequently, under the control of processor 101, end effector 2 applies the coating agent to workpiece Wk (step St102). This coating is performed by brush Br included in end effector 2.

Subsequently, processor 101 determines whether or not the coating has succeeded based on the captured image captured by camera CAM (step St103). Camera CAM captures at least the brush tip of brush Br. This capturing may be performed every lapse of a predetermined time, or may be continuously performed. The captured image is acquired via image acquisition unit 104, and determination processing is performed by processor 101. A specific example of this determination processing will be described later with reference to FIG. 13 and subsequent drawings.

When it is determined that the coating has succeeded (Step St103: COATING OK), robot device 500 removes workpiece Wk from mounting portion T1 of work table T under the control of processor 101 (Step St104). Removed workpiece Wk is transferred to a next work step by robot device 500.

When it is determined that the coating has failed (step St103: CATING NG), processor 101 determines whether or not the number of times of coating to workpiece Wk during the coating work has exceeded a predetermined number of times (N). When the number of times of coating to workpiece Wk during the coating work has exceeded N (step St105: Yes), processor 101 detects an abnormality (step St106). When the abnormality is detected, the abnormality may be notified to the outside of control device 100 by using notification means (alarms, fluorescent lamps, or the like) (not illustrated).

When the abnormality is detected (step St106), the processing proceeds to step St104 of removing workpiece Wk from mounting portion T1 of work table T. However, since the coating of workpiece Wk in which the abnormality is detected has failed, removed workpiece Wk is not transferred to the next work step, and is reused, discarded, or the like after repair.

When the number of times of coating does not exceed the predetermined number of times (N) in step St105 (step St105: No), the processing returns to step St102, and the coating (recoating) is performed on workpiece Wk again. At the time of recoating, the coating may be performed again under a condition different from a coating condition in the previous coating. For example, the previous coating means that a coating direction is changed from a longitudinal direction (x-axis direction) to a lateral direction (y-axis direction), a location (coordinate) to be applied is different from the previous location, and the like.

Inspection may be performed on workpiece Wk on which the coating is finished. As described above, the coating agent to be applied to workpiece Wk may be mixed with a dye or the like shining in black light. It is possible to inspect whether there is a leakage portion or unevenness of coating by applying black light (not illustrated) to workpiece Wk on which the coating work has been finished. This inspection may be performed before or after workpiece Wk is removed from mounting portion T1 of work table T (step St104).

(Determination of Coating Success or Failure)

Next, a specific example of the determination of the coating success or failure in above-described step St103 will be described with reference to FIG. 13 and subsequent drawings. As described above, camera CAM captures the brush tip of brush Br. Processor 101 determines the coating success or failure based on the captured image. More specifically, processor 101 determines the coating success or failure based on the shape of the brush tip of brush Br captured by camera CAM.

Figure 13:
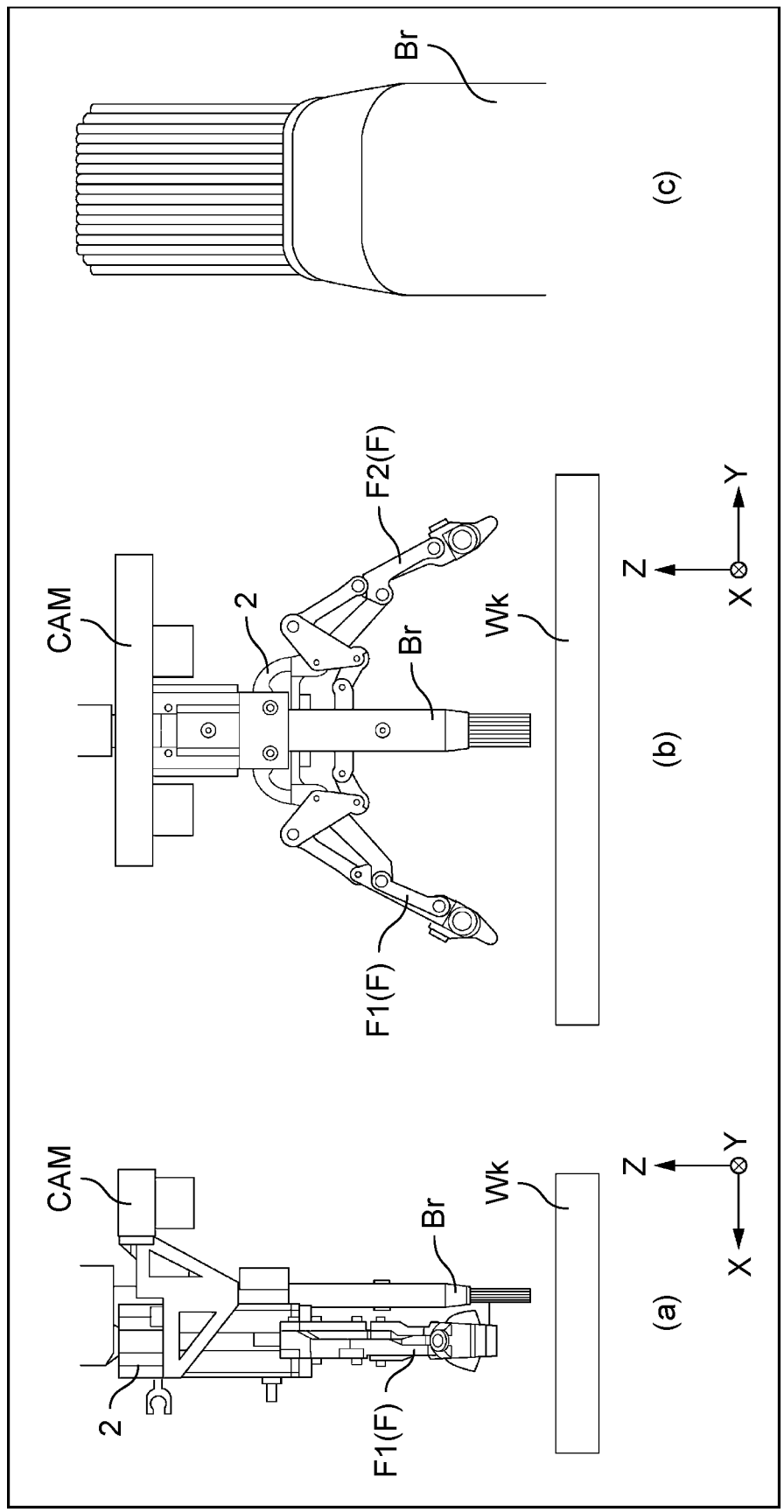
FIG. 13 is a drawing illustrating a state where a brush tip of brush Br is not in contact with workpiece Wk (a state where the coating is not performed), part (a) is a front view, part (b) is a side view, and part (c) is a drawing illustrating a shape of the brush tip of brush Br reflected in a captured image.

First, FIG. 13 is a drawing illustrating a state where the brush tip of brush Br is not in contact with workpiece Wk (a state where the coating is not performed), and part (a) is a drawing illustrating a front view, part (b) is a side view, and part (c) illustrates the shape of the brush tip of brush Br reflected in the captured image.

As illustrated in parts (a) and (b) of FIG. 13, when the coating is not performed, the brush tip of brush Br is not in contact with workpiece Wk. Thus, the shape of the brush tip of brush Br reflected in the captured image has a shape in an initial state without deformation (hereinafter, initial shape). Although various shapes can be considered as the initial shape of the brush tip of brush Br used by end effector 2, in the example of part (c) of FIG. 13, the initial shape is illustrated as being substantially rectangular. Data indicating the shape of the brush tip in the initial state may be stored in memory 102 or the like of control device 100.

Figure 14:
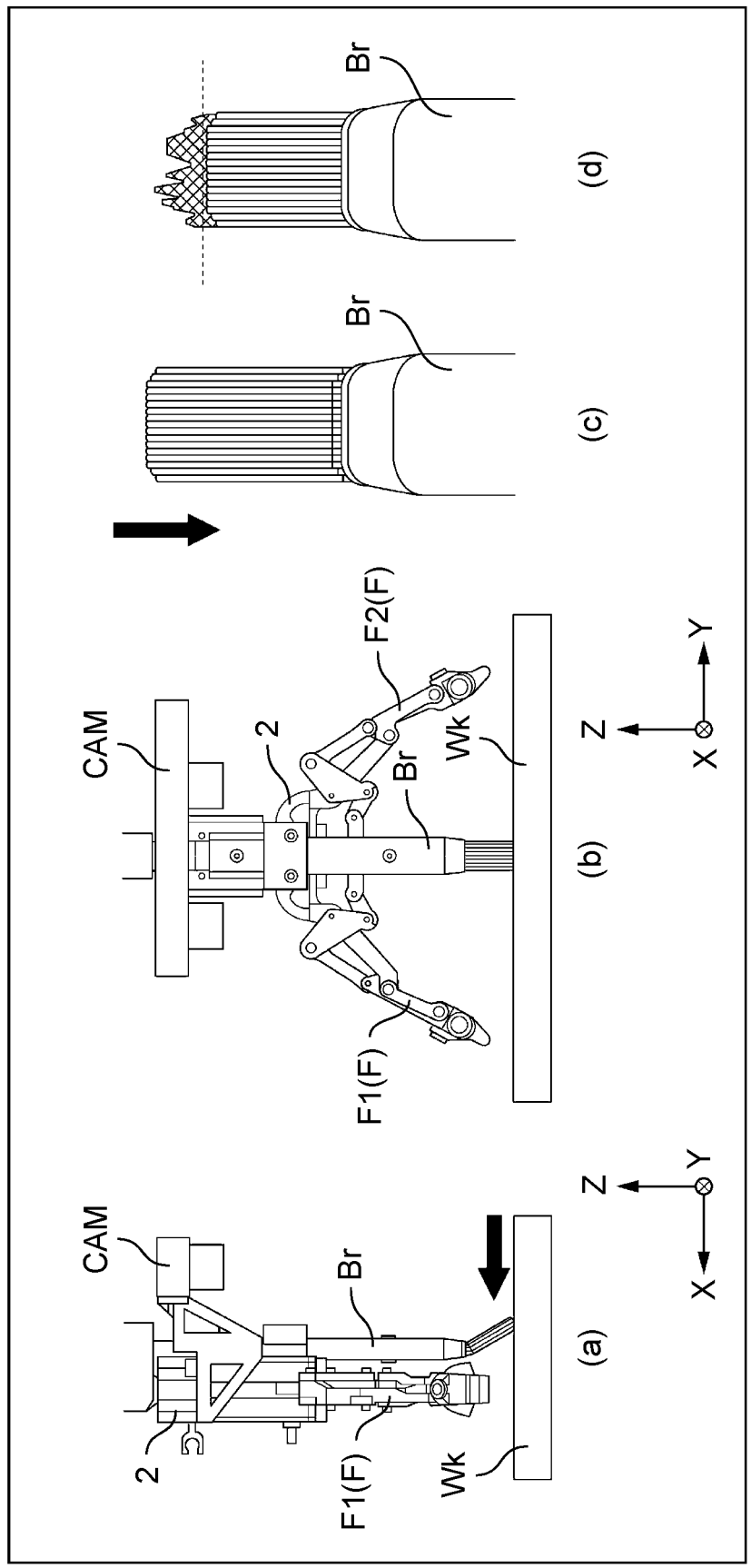
FIG. 14 is a drawing illustrating a state where the coating is performed on workpiece Wk in a lower direction of the captured image, part (a) is a front view, part (b) is a front side view, part (c) is a first drawing illustrating the shape of the brush tip of brush Br reflected in the captured image, and part (d) is a second drawing illustrating the shape of the brush tip of brush Br reflected in the captured image.

Next, FIG. 14 is a drawing illustrating a state where the coating is performed on workpiece Wk in a lower direction (+x direction) of the captured image, part (a) is a front view, part (b) is a side view, part (c) is a first drawing illustrating the shape of the brush tip of brush Br reflected in the captured image, and part (d) is a second drawing illustrating the shape of the brush tip of brush Br reflected in the captured image. In FIGS. 14 to 18, an upper-lower direction (x-axis direction) and a left-right direction (y-axis direction) indicate upper, lower, left, and right directions in the captured image captured by camera CAM.

As illustrated in parts (a) and (b) of FIG. 14, when the coating is performed in the lower direction of the captured image, the brush tip of brush Br comes into contact with workpiece Wk and is deformed. This deformation is reflected in the image captured by camera CAM.

As illustrated in part (c) of FIG. 14, the shape of the brush tip of brush Br reflected in the captured image has a substantially rectangular shape that is more vertically long than the initial shape. That is, the shape of the brush tip of brush Br is deformed to be recognizable on the captured image. Thus, for example, as illustrated in parts (c) and (d) of FIG. 14, when the distal end portion of the brush tip is deformed, processor 101 determines that the coating has succeeded (step St103: COATING OK). On the other hand, when it cannot be detected from the captured image that the distal end portion of the brush tip is deformed, processor 101 determines that the coating has failed (step St103: COATING NG).

A more specific determination example will be described. A broken line illustrated in part (d) of FIG. 14 indicates a position of the distal end portion of the brush tip in the initial shape. When it can be detected from the captured image that the distal end portion of the brush tip protrudes from the broken line portion in the upper direction of the captured image, it is determined that the coating has succeeded (step St103: COATING OK). This is because the distal end portion of the brush tip of brush Br naturally moves in the upper direction in the captured image since the coating is performed while the brush is moved in the lower direction in the captured image. The above determination may be performed by processor 101 that acquires the data indicating the initial shape of the brush tip of brush Br stored in memory 102 and compares the data with the initial shape.

Figure 15:
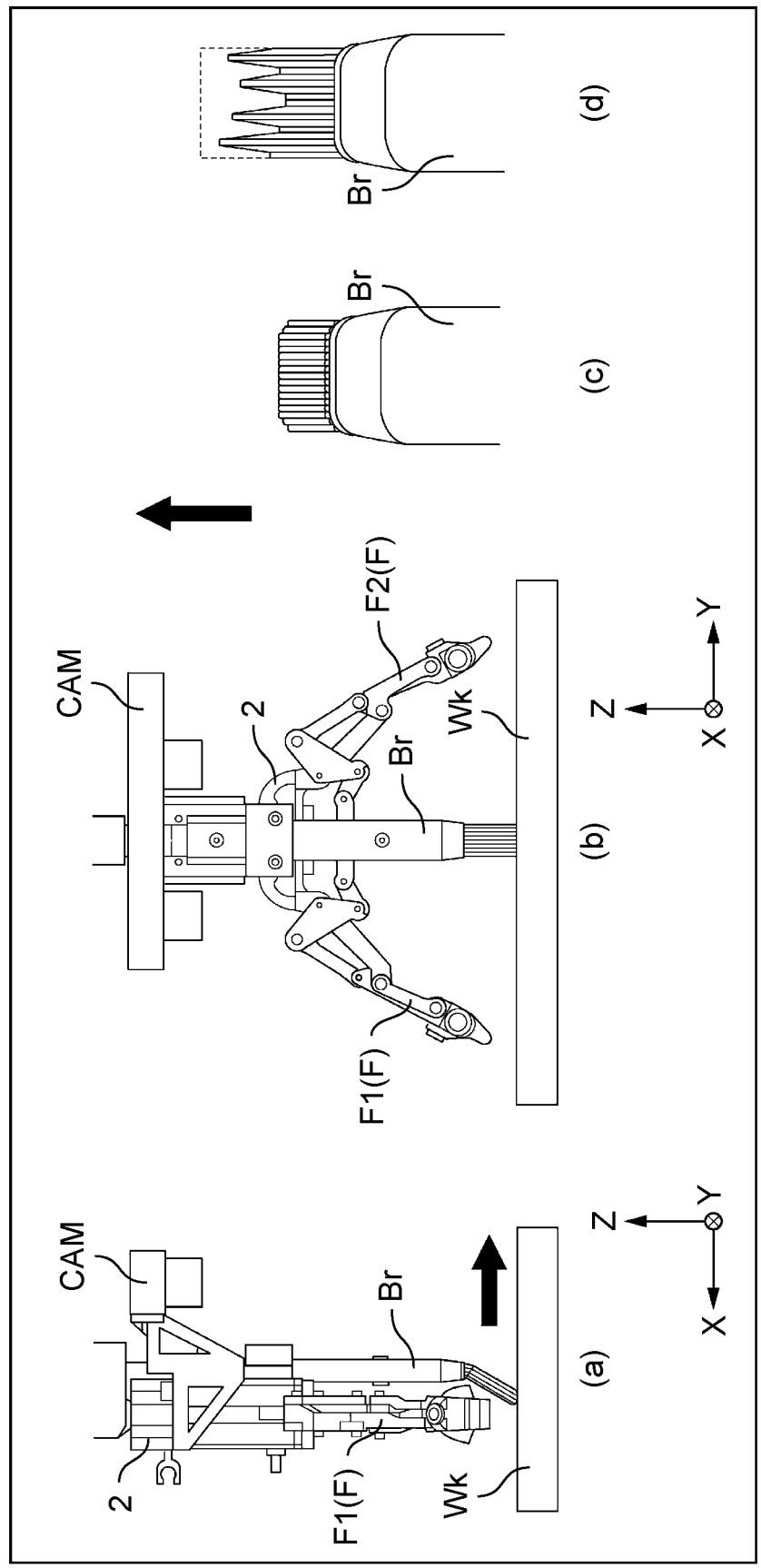
FIG. 15 is a drawing illustrating a state where the coating is performed on workpiece Wk in an upper direction of the captured image, part (a) is a front view, part (b) is a side view, part (c) is a first drawing illustrating the shape of the brush tip of brush Br reflected in the captured image, and part (d) is a second drawing illustrating the shape of the brush tip of brush Br reflected in the captured image.

FIG. 15 is a drawing illustrating a state where the coating is performed on workpiece Wk in the upper direction (−x direction) of the captured image, part (a) is a front view, part (b) is a side view, part (c) is a first drawing illustrating the shape of the brush tip of brush Br reflected in the captured image, and part (d) is a second drawing illustrating the shape of the brush tip of brush Br reflected in the captured image.

As illustrated in part (a) of FIG. 15 and FIG. 15(*b*), when the coating is performed in the upper direction of the captured image, the brush tip of brush Br comes into contact with workpiece Wk and is deformed. This deformation is reflected in the image captured by camera CAM.

As illustrated in part (c) of FIG. 15, the shape of the brush tip of brush Br reflected in the captured image has a substantially rectangular shape shorter in the upper-lower direction than the initial shape. That is, the shape of the brush tip of brush Br is deformed to be recognizable on the captured image. Thus, for example, as illustrated in parts (c) and (d) of FIG. 15, when the distal end portion of the brush tip is deformed, processor 101 determines that the coating has succeeded (step St103: COATING OK). On the other hand, when it cannot be detected from the captured image that the distal end portion of the brush tip is deformed, processor 101 determines that the coating has failed (step St103: COATING NG).

A more specific determination example will be described. A broken line illustrated in part (d) of FIG. 15 indicates the position of the distal end portion of the brush tip in the initial shape. When it can be detected from the captured image that the distal end portion of the brush tip is further drawn in the lower direction of the captured image than the broken line portion, it is determined that the coating has succeeded (Step St103: COATING OK). This is because the distal end portion of the brush tip of brush Br naturally moves in the lower direction in the captured image since the coating is performed while the brush is moved in the upper direction in the captured image. The above determination may be performed by processor 101 that acquires the data indicating the initial shape of the brush tip of brush Br stored in memory 102 and compares the data with the initial shape.

Figure 16:
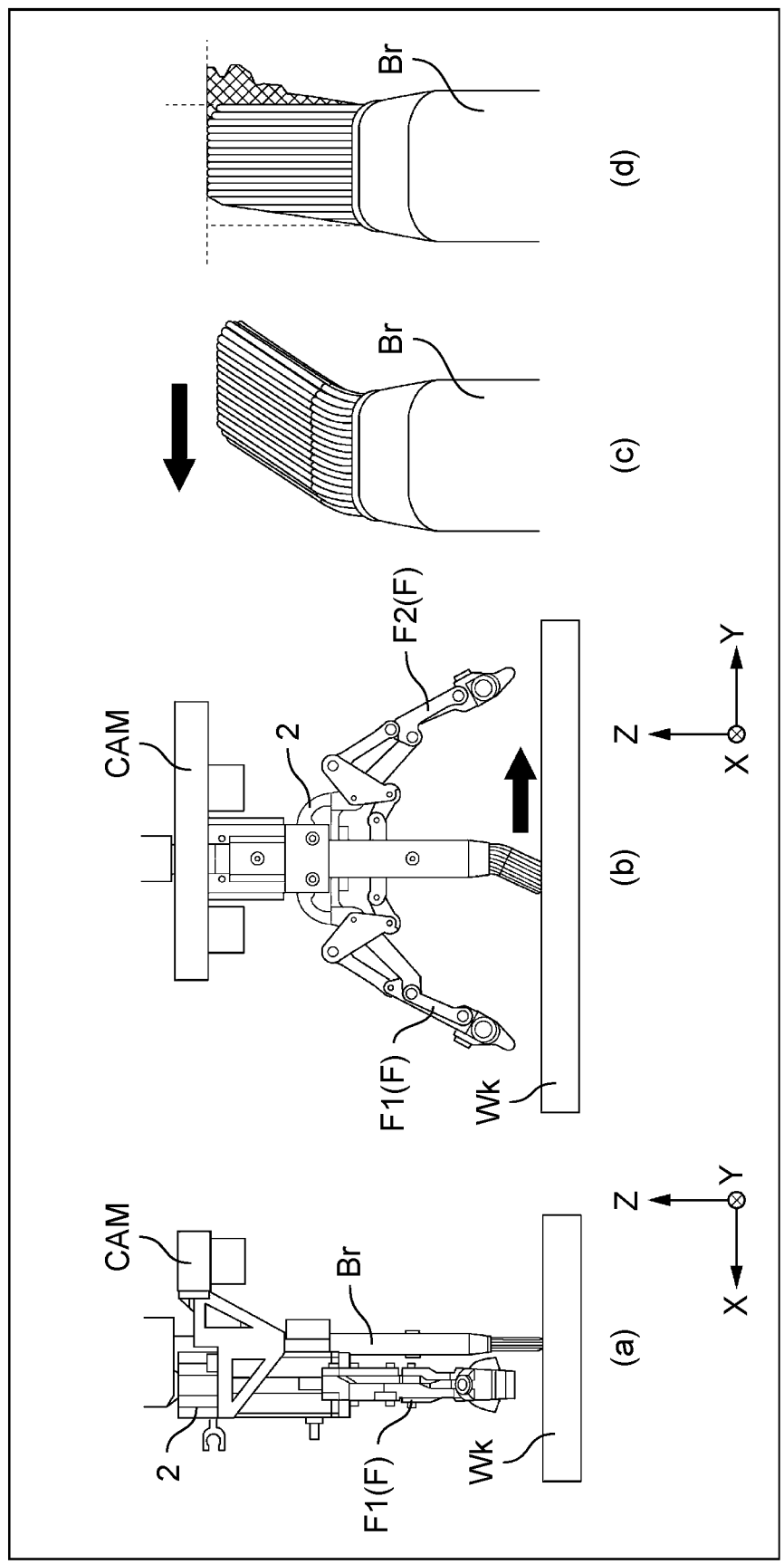
FIG. 16 is a drawing illustrating a state where the coating is performed on workpiece Wk in a left direction of the captured image, part (a) is a front view, part (b) is a side view, part (c) is a first drawing illustrating the shape of the brush tip of brush Br reflected in the captured image, and part (d) is a second drawing illustrating the shape of the brush tip of brush Br reflected in the captured image.

FIG. 16 is a drawing illustrating a state where the coating is performed on workpiece Wk in the left direction (+y direction) of the captured image, part (a) is a front view, part (b) is a side view, part (c) is a first drawing illustrating the shape of the brush tip of brush Br reflected in the captured image, and part (d) is a second drawing illustrating the shape of the brush tip of brush Br reflected in the captured image.

As illustrated in parts (a) and (b) of FIG. 16, when the coating is performed in the left direction of camera CAM, the brush tip of brush Br comes into contact with workpiece Wk and is deformed. This deformation is reflected in the image captured by camera CAM.

As illustrated in part (c) of FIG. 16, the shape of the brush tip of brush Br reflected in the captured image has a shape in which the brush tip is shifted to the right side as compared with the initial shape. That is, the shape of brush Br is deformed to be recognizable on the image. Thus, for example, as illustrated in parts (c) and (d) of FIG. 16, when the distal end portion of the brush tip is deformed, processor 101 determines that the coating has succeeded (step St103:

COATING OK). In the example of FIG. 16, the movement of the distal end portion of the brush tip in the right direction in the captured image is detected. On the other hand, when it cannot be detected from the captured image that the distal end portion of the brush tip is deformed, processor 101 determines that the coating has failed (step St103: COATING NG).

A more specific determination example will be described. A broken line illustrated in part (d) of FIG. 16 indicates the position of the distal end portion of the brush tip in the initial shape. When it can be detected from the captured image that the distal end portion of the brush tip is further drawn in the right direction of the captured image than the broken line portion, it is determined that the coating has succeeded (step St103: COATING OK). This is because the distal end of the brush tip of brush Br naturally moves in the right direction in the captured image since the coating is performed while the brush is moved in the left direction in the captured image. The above determination may be performed by processor 101 that acquires the data indicating the initial shape of the brush tip of brush Br stored in memory 102 and compares the data with the initial shape.

Figure 17:
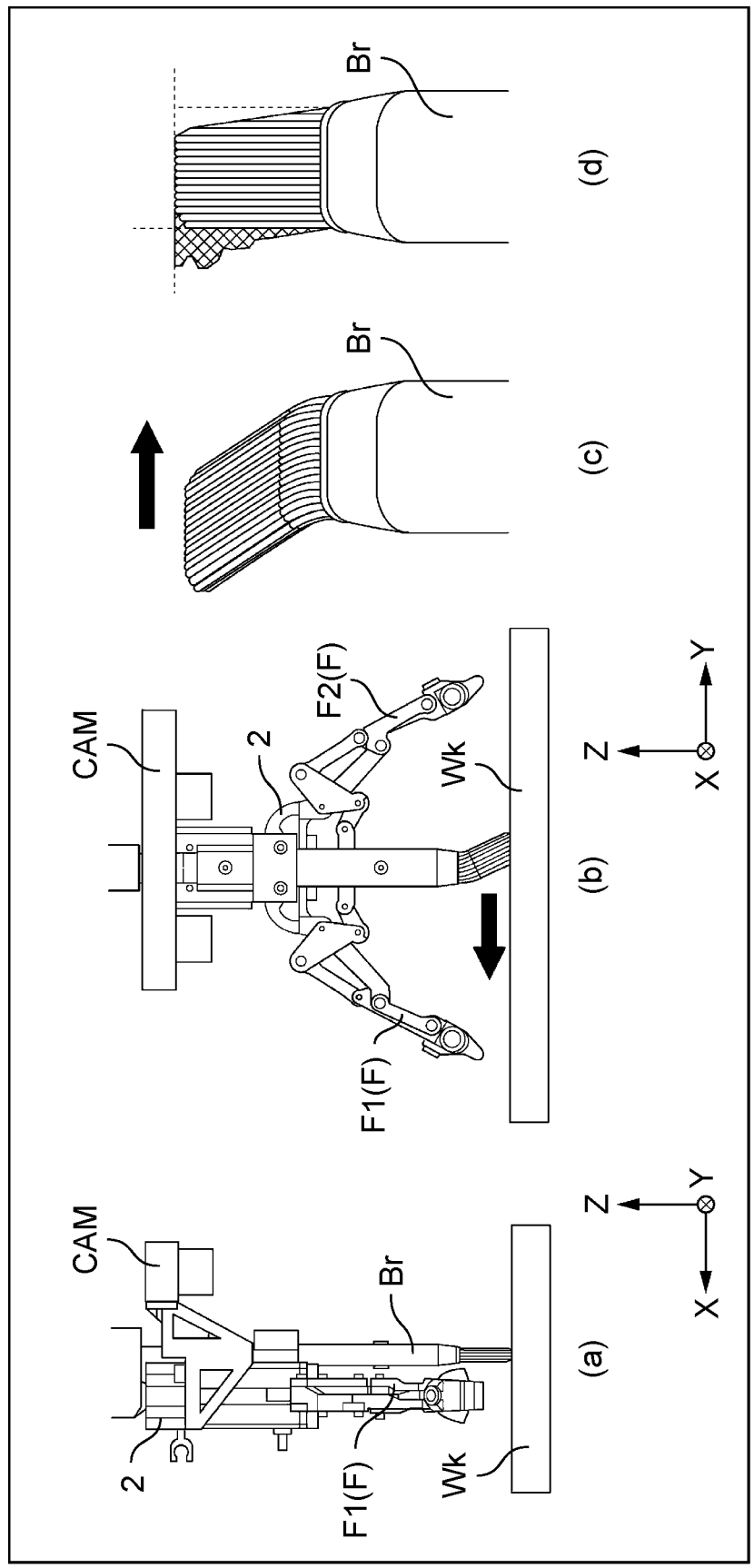
FIG. 17 is a drawing illustrating a state where the coating is performed on workpiece Wk in a right direction of the captured image, part (a) is a front view, part (b) is a side view, part (c) is a first drawing illustrating the shape of the brush tip of brush Br reflected in the captured image, and part (d) is a second drawing illustrating the shape of the brush tip of brush Br reflected in the captured image.

FIG. 17 is a drawing illustrating a state where the coating is performed on workpiece Wk in the right direction (−y direction) of the captured image, part (a) is a front view, part (b) is a side view, part (c) is a first drawing illustrating the shape of the brush tip of brush Br reflected in the captured image, and part (d) is a second drawing illustrating the shape of the brush tip of brush Br reflected in the captured image.

As illustrated in parts (a) and (b) of FIG. 17, when the coating is performed in the left direction of the captured image, the brush tip of brush Br comes into contact with workpiece Wk and is deformed. This deformation is reflected in the image captured by camera CAM.

As illustrated in part (c) of FIG. 17, the shape of the brush tip of brush Br reflected in the captured image has a shape in which the distal end portion of the brush tip is shifted leftward as compared with the initial shape. That is, the shape of brush Br is deformed to be recognizable on the image. Thus, for example, as illustrated in parts (c) and (d) of FIG. 17, processor 101 determines that the coating has succeeded when the distal end portion of the brush tip is deformed (step St103: COATING OK). In the example of FIG. 17, the movement of the distal end portion of the brush tip in the left direction in the captured image is detected. On the other hand, when it cannot be detected from the captured image that the distal end portion of the brush tip is deformed, processor 101 determines that the coating has failed (step St103: COATING NG).

A more specific determination example will be described. The broken line illustrated in part (d) of FIG. 17 indicates the position of the distal end portion of the brush tip in the initial shape. When it can be detected from the captured image that the distal end portion of the brush tip further moves in the left direction of the captured image than the broken line portion, it is determined that the coating has succeeded (step St103: COATING OK). This is because the distal end of the brush tip of brush Br naturally moves in the left direction in the captured image since the coating is performed while the brush is moved in the right direction in the captured image. The above determination may be performed by processor 101 that acquires the data indicating the initial shape of the brush tip of brush Br stored in memory 102 and compares the data with the initial shape.

Figure 18:
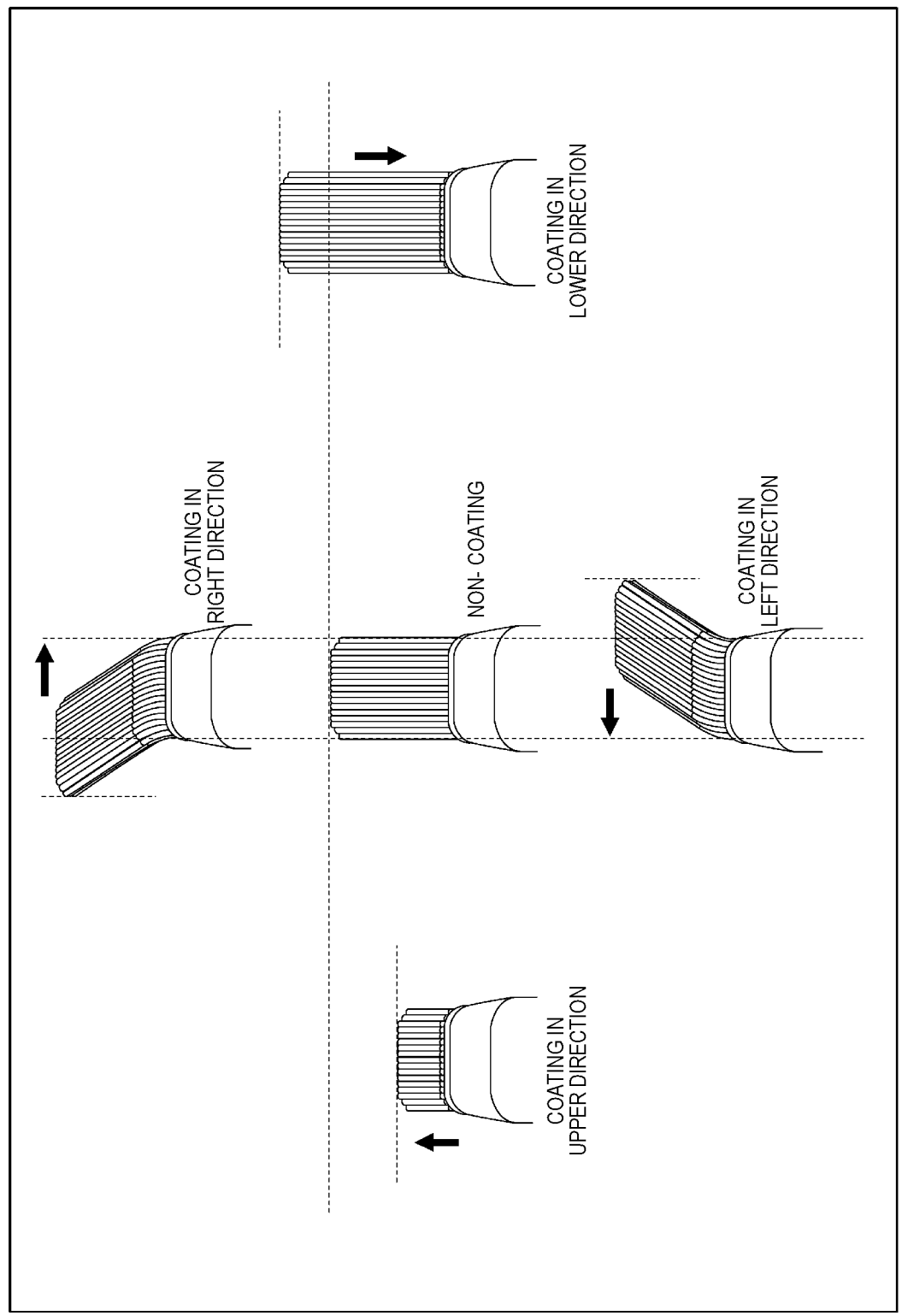
FIG. 18 is an integration diagram of FIGS. 14 to 17.

As described above, the case where the coating is performed on workpiece Wk in each of the upper, lower, left, and right directions of the captured image has been described. FIG. 18 is a summary of the coating in these directions. The shape of the brush tip of brush Br illustrated in a central portion of FIG. 18 is the initial shape of the brush tip. In comparison with this initial shape, the distal end portion of the brush tip moves and is deformed in the upper direction of the captured image when the coating is performed in the lower direction, in the lower direction of the captured image when the coating is performed in the upper direction, in the left direction of the captured image when the coating is performed in the right direction, and in the right direction of the captured image when the coating is performed in the left direction. This movement and deformation are detected by camera CAM.

Although the success or failure determination of the coating when the coating is performed in the upper, lower, left, and right directions of the captured image has been described above, for example, a case where the coating is performed in an oblique direction such as an upper right direction or a lower right direction of the captured image can be considered. Even in such a case, the success or failure determination of the coating can be performed by detecting a change in the shape of the brush tip based on the captured image by camera CAM. For example, when the coating is performed in the upper right direction of the captured image, since the distal end portion of the brush tip is deformed to move in the lower left direction, this deformation can be detected based on the captured image. In this case, the movement of the distal end portion of the brush tip in the left direction and the lower direction may be detected from the captured image. When the coating is performed in other oblique directions, the success or failure determination of the coating can be similarly performed.

(Relative Positional Relationship Among Camera CAM, Brush Br, and Marker M)

Figure 19:
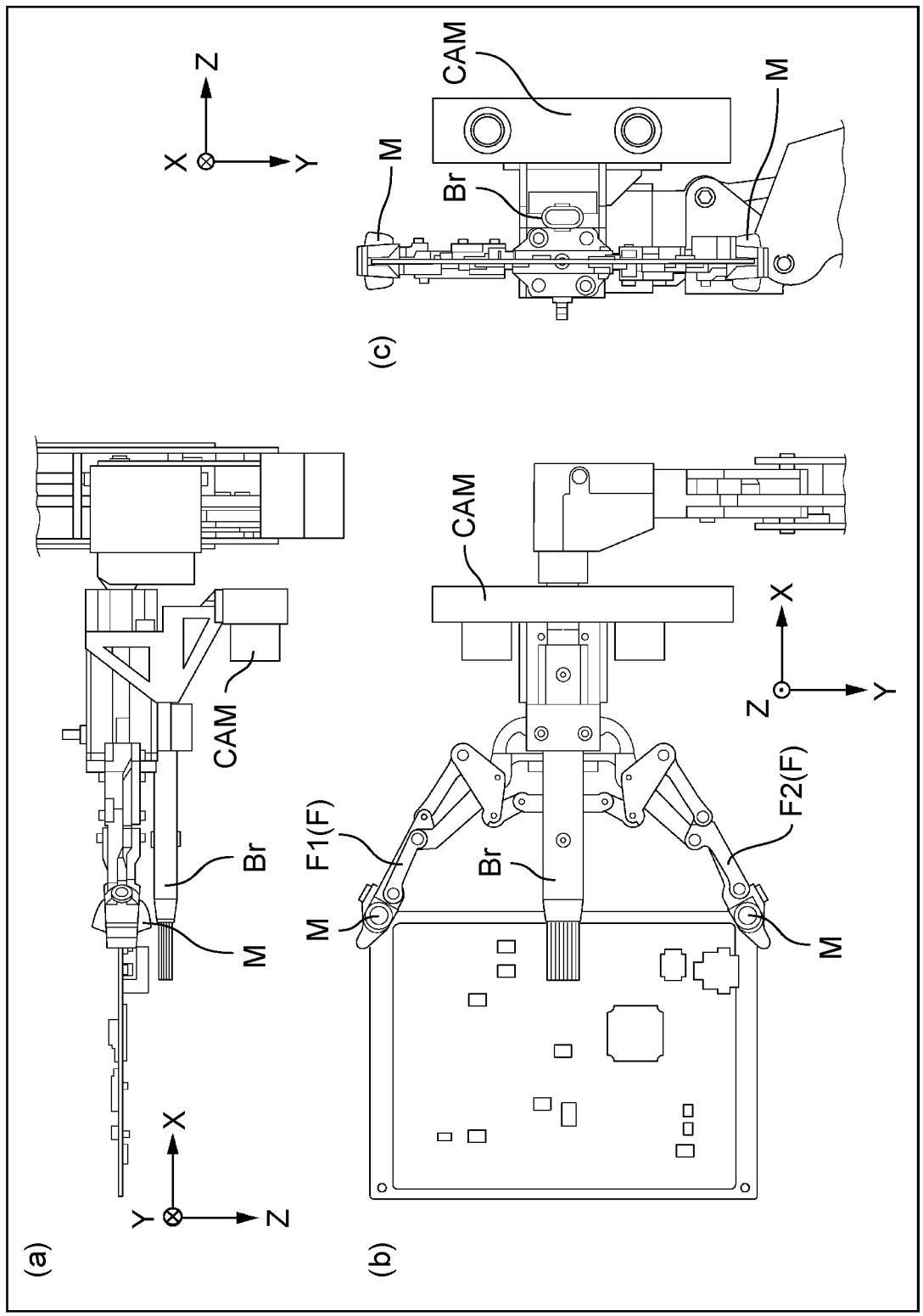
FIG. 19 is a diagram illustrating end effector 2, part (a) is a front view, part (b) is a plan view, and part (c) is a side view.

Next, a relative positional relationship among camera CAM, brush Br, and marker M will be described with reference to FIG. 19. FIG. 19 is a drawing illustrating end effector 2, part (a) is a front view, part (b) is a plan view, and part (c) is a side view.

As shown in FIG. 19, fingers F may include markers M. In this case, camera CAM is arranged at a position where both the brush tip of brush Br and markers M of fingers F are reflected (both are included in the angle of view). As a result, camera CAM can simultaneously capture the brush tip of brush Br and markers M. Even when the support member is a member other than fingers F, the brush tip and the markers (including characteristic shape, pattern, and the like) can be simultaneously captured by means for providing a marker on the support member or forming the support member itself such that any characteristic shape, pattern, and the like appear.

More preferably, as shown in parts (a) to (c) of FIG. 19, as viewed from brush Br, camera CAM and fingers F of end effector 2 (and markers M included in fingers F) are not on the same side. In other words, the members are arranged in the order of camera CAM, brush Br, and fingers F in a z-axis direction (the x-axis direction in a state where the coating agent can be applied to workpiece Wk illustrated in part (a) of FIG. 10) in the gripping state where fingers F illustrated in parts (a) and (c) of FIG. 19 grip workpiece Wk. With such a relative positional relationship, brush Br as viewed from camera CAM is arranged at a closer position than first finger F1 and second finger F2 as viewed from camera CAM. As a result, since it is possible to capture the brush tip of brush Br reflected in the captured image with higher accuracy, determination accuracy in determining whether or not the coating has succeeded (step St103) is improved.

However, the relative positional relationship among camera CAM, brush Br, and markers M may be different from the above relative positional relationship. For example, as viewed from markers M, a positional relationship in which camera CAM and brush Br are not on the same side can be used. In other words, the members are arranged in the order of camera CAM, markers M, and brush Br. Even in such a relative positional relationship, when an image is captured by camera CAM, markers M are arranged at a position where markers M do not block the brush tip of brush Br, and thus, both the brush tip and markers M can be simultaneously reflected in the captured image.

As described above, in a coating state where the coating is performed on workpiece Wk by brush Br, the brush tip of brush Br protrudes toward workpiece Wk from the support member (fingers F or the like). As a result, it is possible to avoid the support member from colliding with workpiece Wk or the like at the time of coating.

Camera CAM and the support member are not on the same side as viewed from brush Br. As a result, brush Br as viewed from camera CAM is arranged at a closer position than the support member (first finger F1, second finger F2, and the like) as viewed from camera CAM. As a result, since brush Br in the captured image can be captured with higher accuracy, the determination accuracy in determining whether or not the coating has succeeded is improved.

Control device 100 that controls end effector 2 includes controller (processor 101), and the controller determines that the coating has succeeded in a case where the shape of the brush tip of brush Br in the captured image captured by camera CAM when the coating is performed on workpiece Wk by brush Br changes from the initial shape of the brush tip. As a result, it is possible to determine the success or failure of the coating by detecting the change in the shape of the brush tip by using camera CAM.

When the position of the distal end portion of brush Br changes in a direction opposite to a moving direction of brush Br in the coating, it is determined that the coating has succeeded. As a result, the success or failure of the coating can be correctly determined according to the moving direction of brush Br.

Although various exemplary embodiments have been described above with reference to the drawings, it is needless to say that the present disclosure is not limited to such examples. It is apparent that those skilled in the art can conceive various modification examples, revision examples, substitution examples, addition examples, removal examples, equivalent examples, and the like within the scope of claims, and those examples are of course understood to be within the technical scope of the present disclosure. Additionally, each component in the various exemplary embodiments described above may be appropriately combined without departing from the spirit of the disclosure.

The present disclosure is useful as an end effector including a camera, a support member, and a brush.

What is claimed is:

1. An end effector that is connectable to a robot arm, the end effector comprising:
   a camera;
   a support member that includes a marker and supports a workpiece; and
   a brush that performs coating on the workpiece,
   wherein the camera is arranged at a position allowing the camera to capture a brush tip of the brush and the marker simultaneously.

2. The end effector according to claim 1, wherein in a coating state in which the brush performs the coating, the brush tip of the brush further protrudes toward the workpiece than the support member does.

3. The end effector according to claim 1, wherein the camera and the support member are not positioned on a same side of the brush.

4. A system comprising the end effector according to claim 1 and a control device for controlling the end effector, the control device comprising a controller that determines that the coating has succeeded in a case where a shape of the brush tip of the brush in a captured image captured by the camera when the coating is performed by the brush is changed from an initial shape of the brush tip.

5. The system according to claim 4, wherein the controller determines that the coating has succeeded when a position of a distal end portion of the brush changes in a direction opposite to a moving direction of the brush in the coating.

* * * * *